US011016827B2

(12) United States Patent
Yoo et al.

(10) Patent No.: US 11,016,827 B2
(45) Date of Patent: May 25, 2021

(54) METHOD AND DEVICE FOR DISPLAYING NOTIFICATION

(71) Applicant: SAMSUNG ELECTRONICS CO., LTD., Suwon-si (KR)

(72) Inventors: Jung-hyun Yoo, Seoul (KR); Seung-chul Ko, Suwon-si (KR); Gi-hun Jung, Seoul (KR); Sung-min Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/504,686

(22) Filed: Jul. 8, 2019

(65) Prior Publication Data
US 2019/0332448 A1 Oct. 31, 2019

Related U.S. Application Data

(63) Continuation of application No. 15/386,809, filed on Dec. 21, 2016, now Pat. No. 10,387,224, which is a continuation of application No. PCT/KR2016/008209, filed on Jul. 27, 2016.

(30) Foreign Application Priority Data

Jul. 27, 2015 (KR) .................. 10-2015-0106094

(51) Int. Cl.
G06F 9/54 (2006.01)
(52) U.S. Cl.
CPC .............. G06F 9/542 (2013.01); G06F 9/541 (2013.01)
(58) Field of Classification Search
CPC ...................................... G06F 9/541

USPC ......................................... 719/319
See application file for complete search history.

(56) References Cited

U.S. PATENT DOCUMENTS

| 7,788,593 | B1 | 8/2010 | Grechishkin et al. |
| 8,856,950 | B2 | 10/2014 | Kim |
| 8,978,051 | B2 | 3/2015 | Wang |
| 9,178,981 | B2 | 11/2015 | Cho et al. |
| 9,436,850 | B2 | 9/2016 | Kim et al. |
| 2001/0037488 | A1* | 11/2001 | Lee ................. G06Q 30/02 717/100 |

(Continued)

FOREIGN PATENT DOCUMENTS

| KR | 10-2012-0070476 | 6/2012 |
| KR | 10-2012-0089985 | 8/2012 |

OTHER PUBLICATIONS

International Search Report and Written Opinion of the ISA for PCT/KR2016/008209, dated Nov. 30, 2016, 12 pages.

(Continued)

Primary Examiner — Andy Ho
(74) Attorney, Agent, or Firm — Nixon & Vanderhye, P.c.

(57) ABSTRACT

Disclosed is a method of displaying a notification on a device with a plurality of operating systems (OSes) installed therein. The method includes identifying a first OS displayed on a first display of the device among the plurality of OSes, detecting a notification generated in a second OS running in a background of the device among the plurality of OSes, converting the generated notification based on a preset format of the first OS when the notification is generated, and displaying the converted notification on the first display on which the first OS is displayed.

20 Claims, 24 Drawing Sheets

(56) References Cited

U.S. PATENT DOCUMENTS

| | | |
|---|---|---|
| 2001/0044817 A1 | 11/2001 | Asano et al. |
| 2012/0192100 A1 | 7/2012 | Wang et al. |
| 2012/0236012 A1 | 9/2012 | Wang |
| 2013/0298140 A1* | 11/2013 | Wolfe .................... G06F 9/542 |
| | | 719/319 |
| 2015/0058611 A1 | 2/2015 | Reeves et al. |
| 2015/0193241 A1 | 7/2015 | Hamzata et al. |
| 2015/0193285 A1 | 7/2015 | Hamzata et al. |

OTHER PUBLICATIONS

Notice of Non-Final Rejection dated Mar. 16, 2021 in counterpart KR Application No. 2016-0106983 and English-language translation.

* cited by examiner

FIG. 1
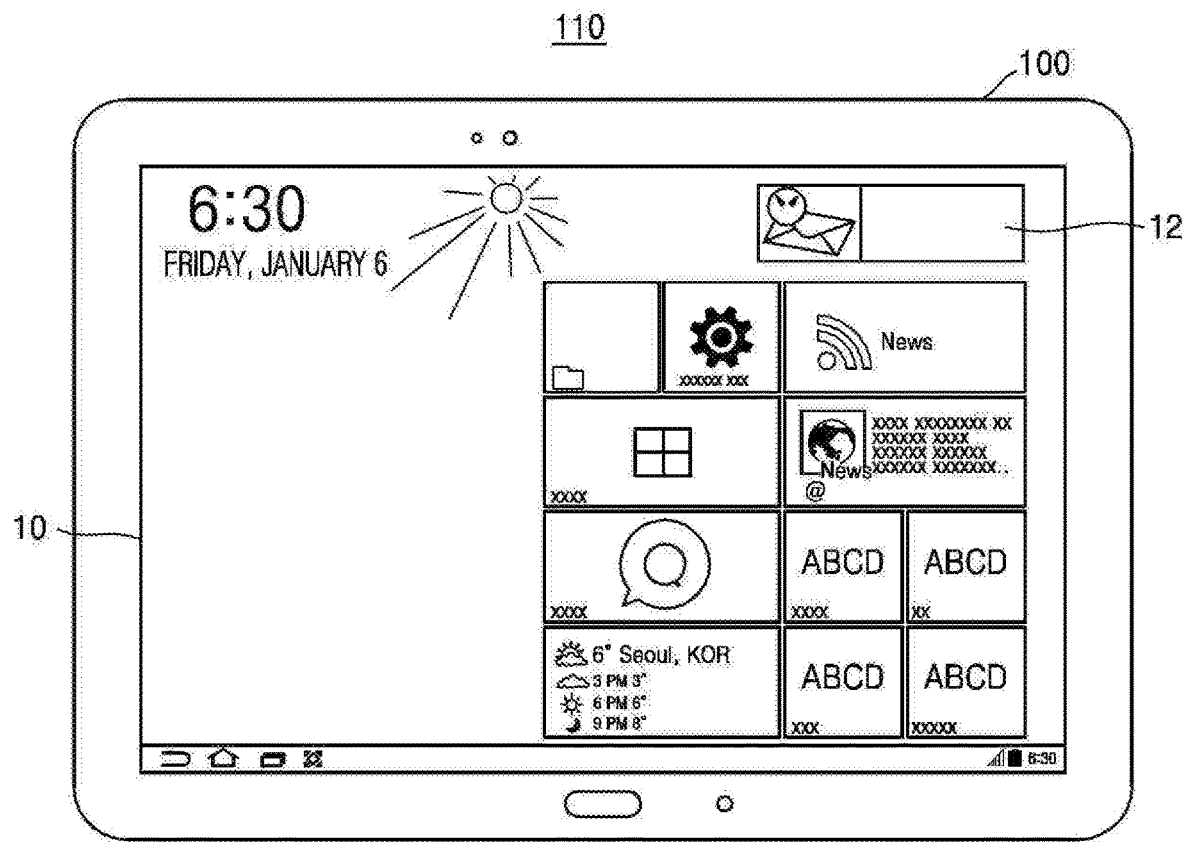
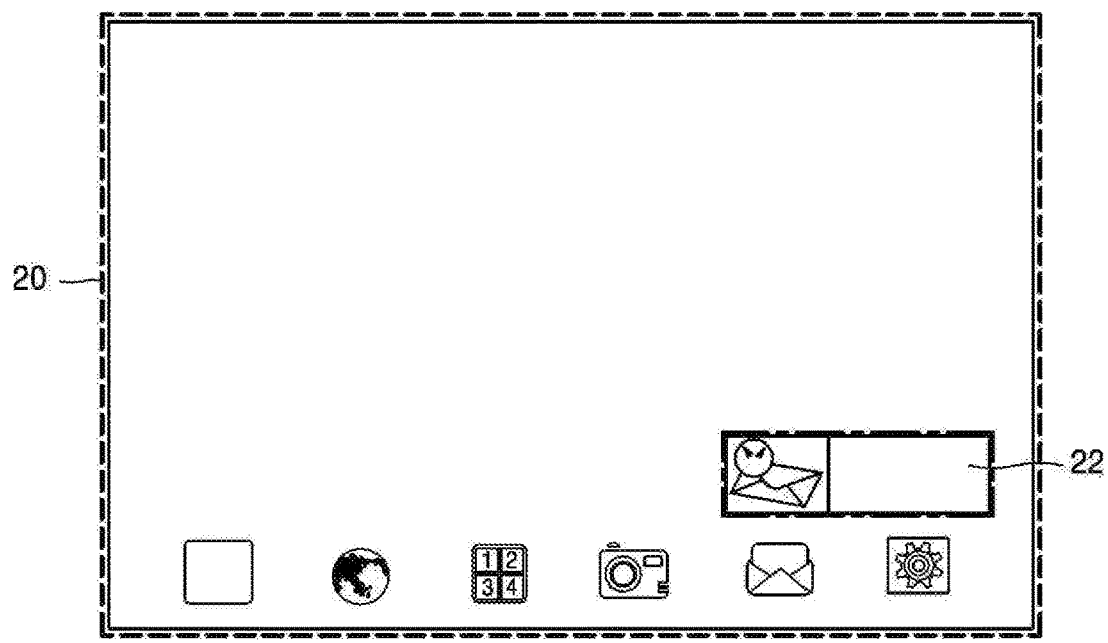

FIG. 3
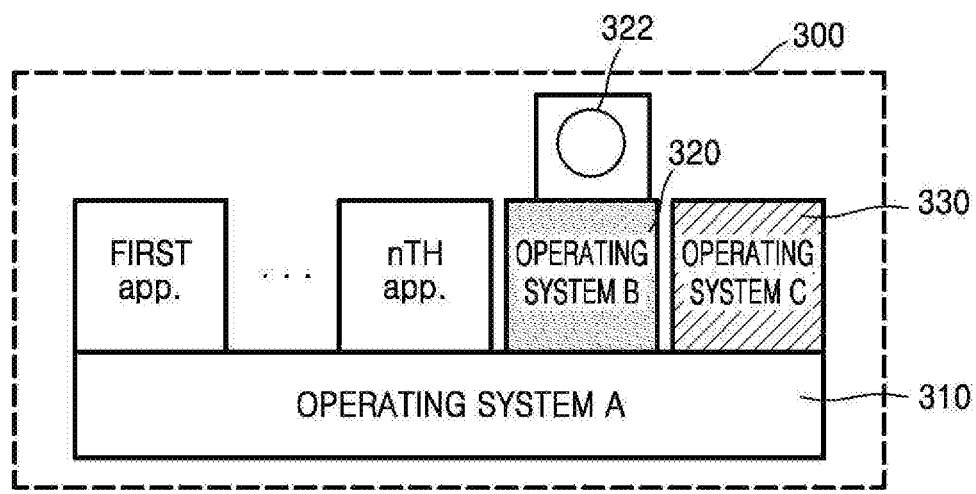
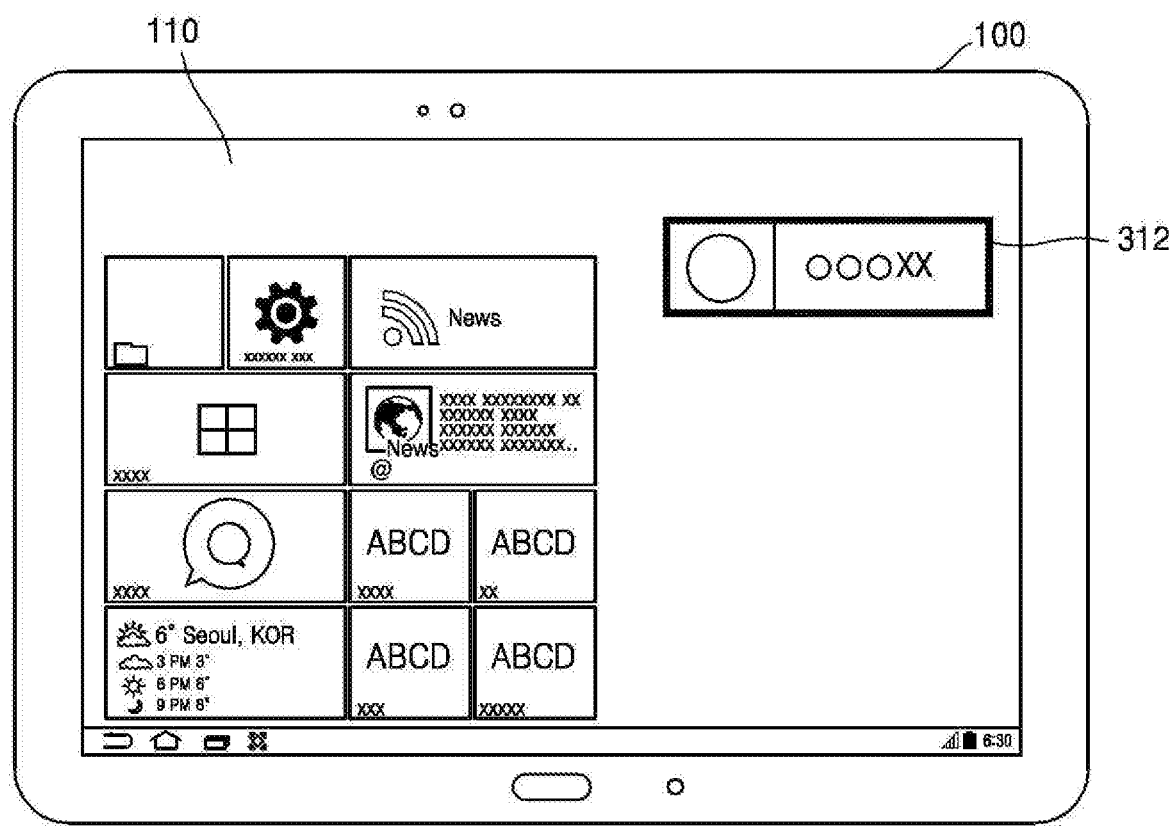

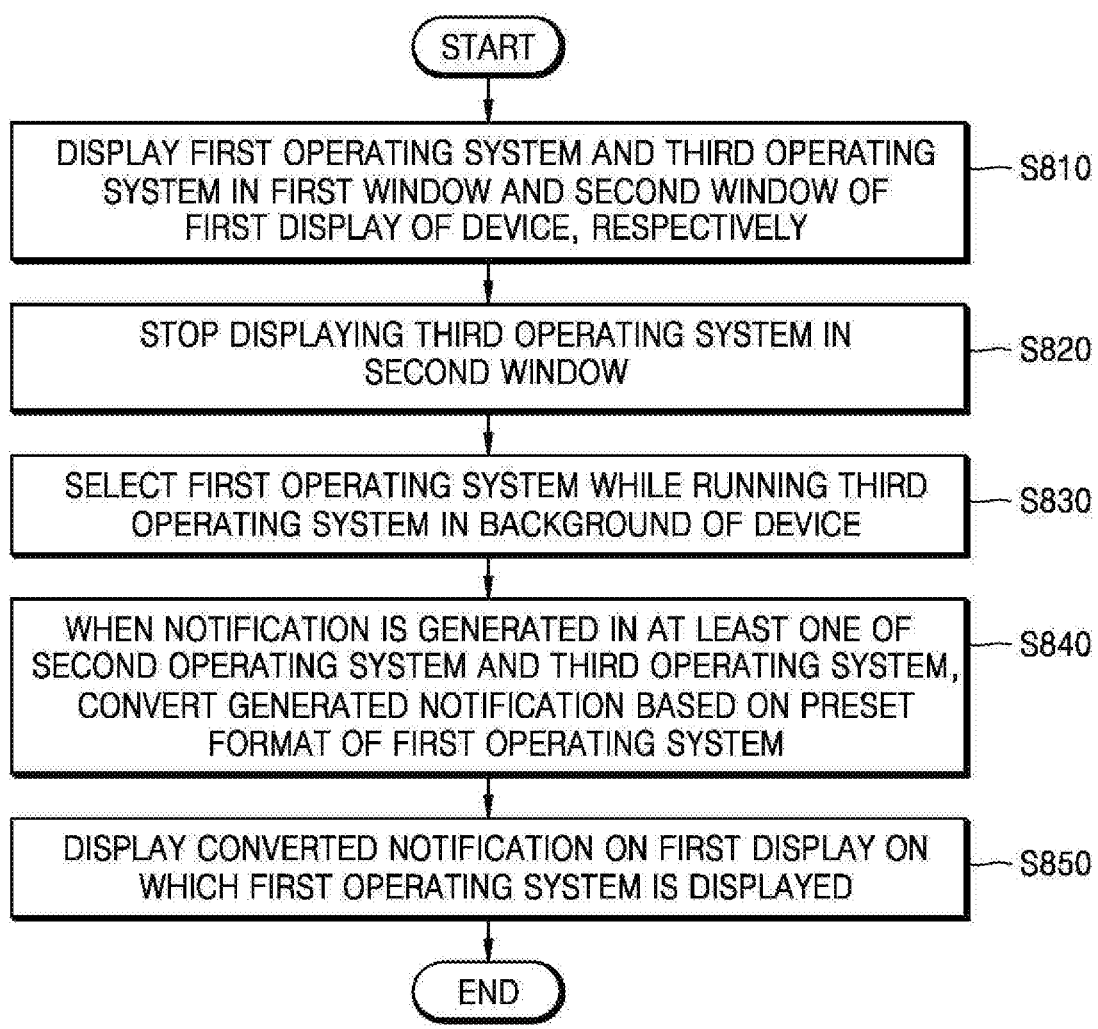

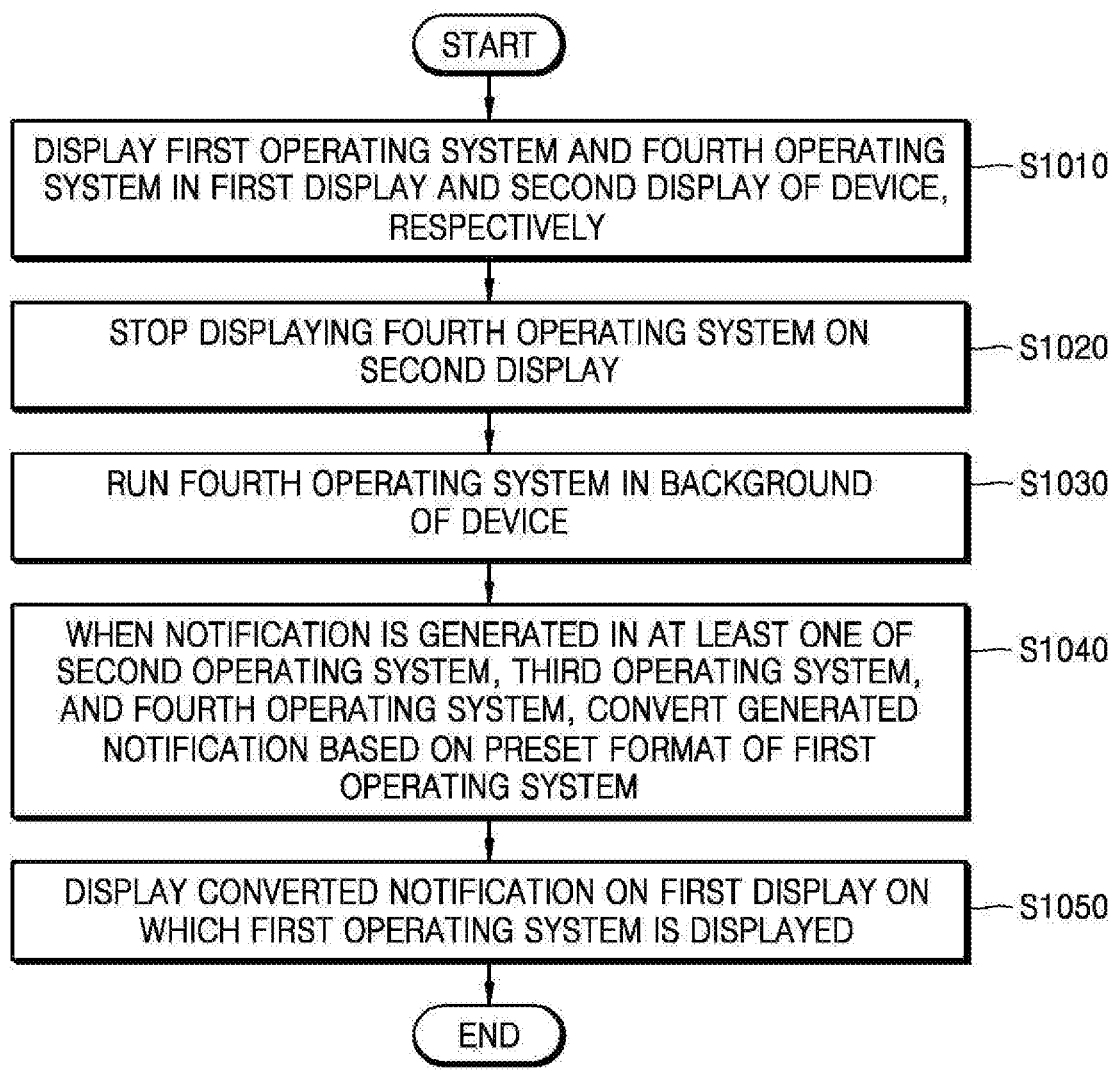

FIG. 11A
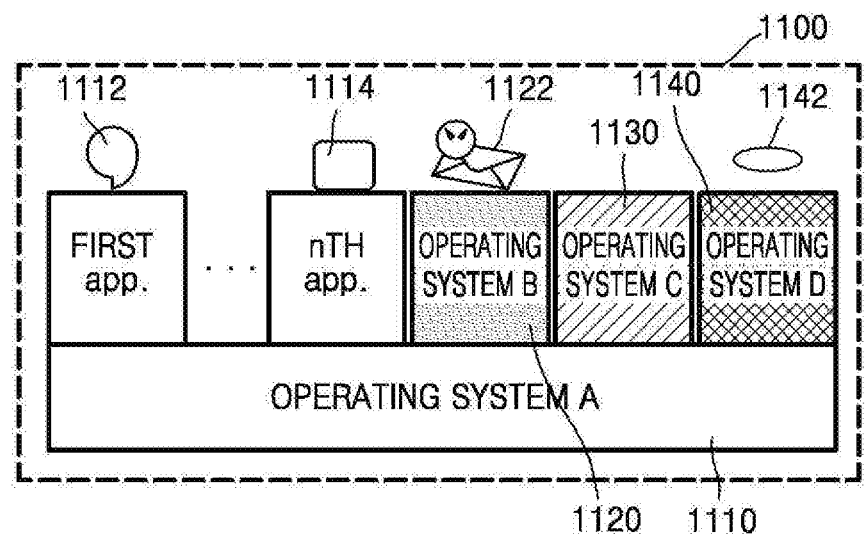
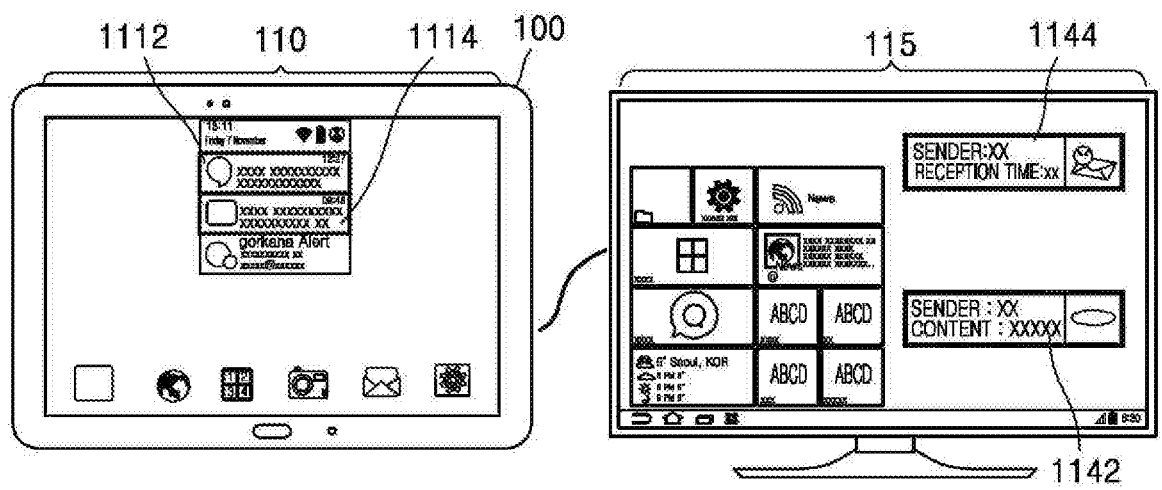

FIG. 11B
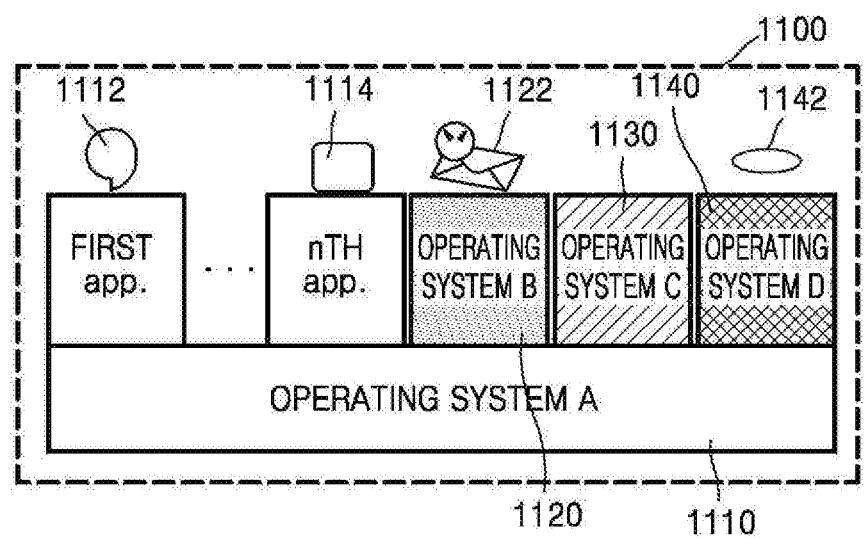
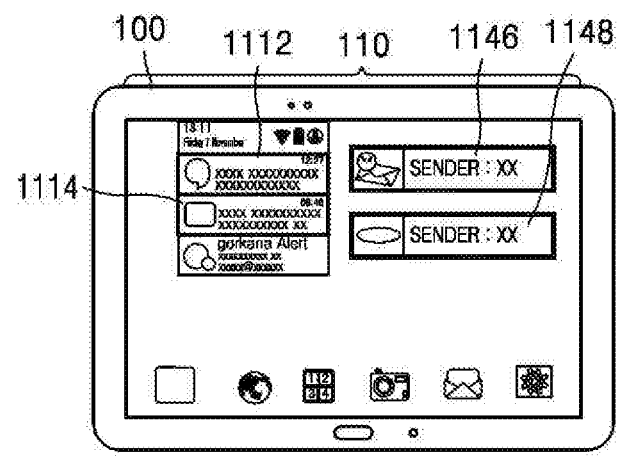

FIG. 15A
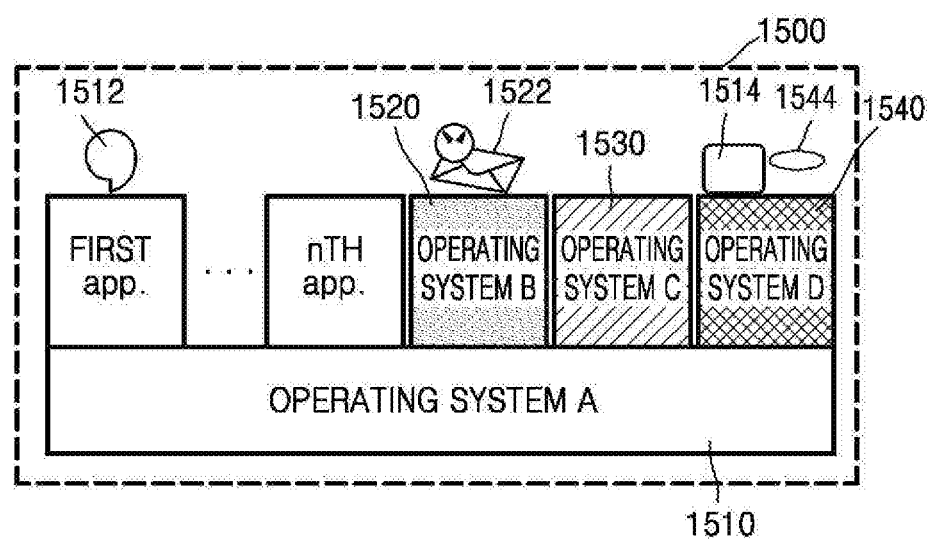
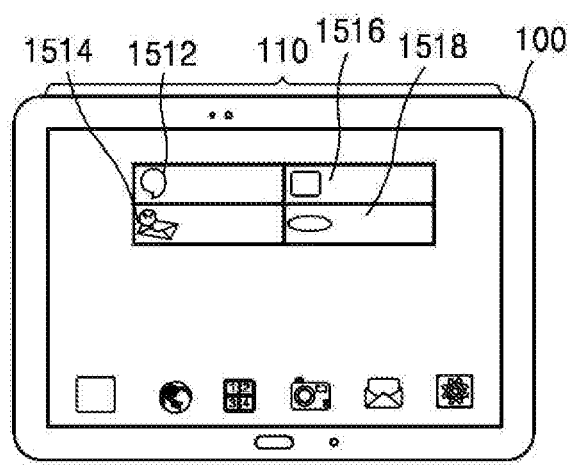

FIG. 15B
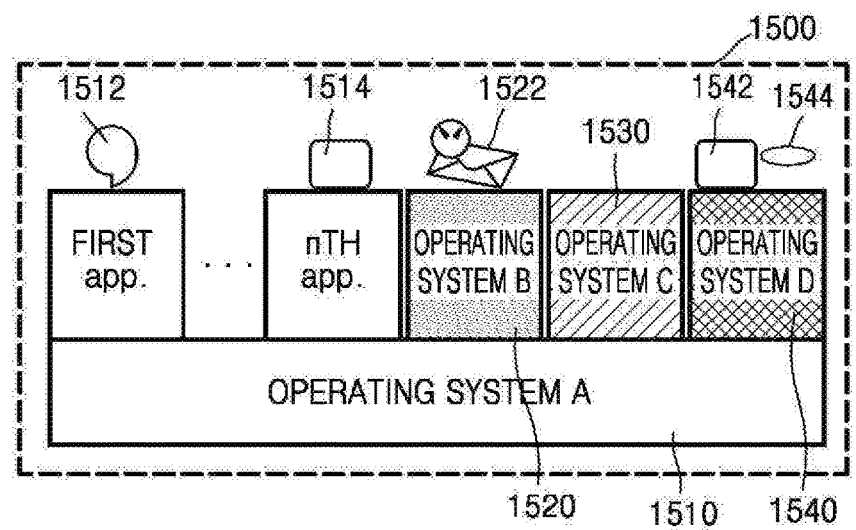
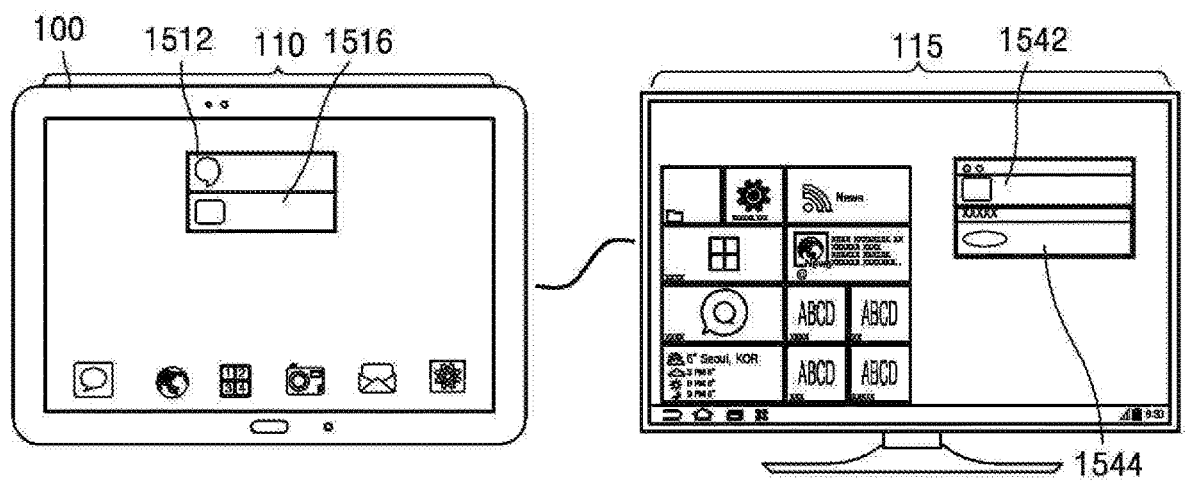

METHOD AND DEVICE FOR DISPLAYING NOTIFICATION

CROSS-REFERENCE TO RELATED APPLICATIONS

This application is a continuation of U.S. patent application Ser. No. 15/386,809, filed Dec. 21, 2016, which is a continuation of International Application No. PCT/KR2016/008209, filed Jul. 27, 2016, which designated the United States and claims priority to Korean Patent Application No. 10-2015-0106094, filed Jul. 27, 2015. The contents of each of these applications are incorporated herein in their entirety.

TECHNICAL FIELD

The present invention relates to a method of displaying a notification on a device with a plurality of operating systems (OSes) installed therein, a device with a plurality of OSes installed therein, and a recoding medium on which the method of displaying a notification on a device with a plurality of OSes installed therein is recorded.

BACKGROUND ART

An operating system (OS) is a program that allows a user to use a computer by controlling hardware and software of the computer. An OS may function as an interface between hardware and application programs and may manage computer resources, such as a central processing unit (CPU), a main memory device, an input/output device, etc. Recently, as users desire to use various computing environments according to objectives or necessity, research into technology for running two or more OSes in one device is required.

DETAILED DESCRIPTION OF THE INVENTION

Technical Problem

Embodiments disclosed herein may provide a method of displaying a notification on a device with a plurality of operating systems (OSes) installed therein, and particularly to, a method of enabling a device with a plurality of OSes installed therein to effectively display notifications of the OSes configured with different instructions.

Technical Solution

A method of displaying a notification on a device with a plurality of operating systems (OSes) installed therein according to an embodiment includes identifying a first OS displayed on a first display of the device among the plurality of OSes; detecting a notification generated in a second OS running in a background of the device among the plurality of OSes; converting the generated notification based on a preset format of the first OS when the notification is generated; and displaying the converted notification on the first display on which the first OS is displayed.

The method according to an embodiment further includes displaying the first OS and a third OS on the first display; and selecting the first OS from between the first OS and the third OS when the notification is generated. The converting of the generated notification includes converting the generated notification based on the preset format of the selected first OS.

In the method according to an embodiment, the selecting of the first OS includes identifying types of the first OS and the third OS; and selecting the first OS based on a type of the notification when the notification is generated in the second OS.

In the method according to an embodiment, the selecting of the first OS includes selecting the first OS based on preset priority information indicating a priority of an OS in which the generated notification is displayed.

The method according to an embodiment may further include dividing a screen area of the first display. The displaying of the first OS and a third OS includes displaying the first OS and the third OS in a first window and a second window, respectively, which are obtained by dividing the screen area.

In the method according to an embodiment, the selecting of the first OS includes selecting the first OS based on a complexity of each of the first window and the second window.

The method according to an embodiment further includes stopping displaying the third OS in the second window; running the third OS in the background of the device; and converting the generated notification based on the preset format of the first OS when the notification is generated in at least one of the second OS and the third OS.

The method according to an embodiment further includes displaying a fourth OS on a second display that is additionally connected to the device; and selecting the first OS from between the first OS and the fourth OS when the notification is generated. The converting of the generated notification includes converting the generated notification based on the preset format of the selected first OS.

The method according to an embodiment further includes detecting the second display. The displaying of a fourth OS on a second display includes displaying the fourth OS running in the background of the device on the second display when the second display is detected.

In the method according to an embodiment, the selecting of the first OS includes identifying types of the first display and the second display; and selecting the first OS displayed on the selected first display based on the identified types of the displays.

In the method according to an embodiment, the selecting of the first OS includes selecting the first OS based on a complexity of each of the first display and the second display.

The method according to an embodiment further includes stopping displaying the fourth OS on the second display; running the fourth OS in the background of the device; and converting the generated notification based on the preset format of the first OS when the notification is generated in the second OS and the fourth OS.

The method according to an embodiment further includes stopping displaying the first OS on the first display; displaying the second OS on the first display; detecting a notification generated in the first OS; and displaying the notification generated in the first OS on the first display on which the second OS is displayed.

A device with a plurality of OSes installed therein according to an embodiment includes a first display configured to display a first OS among the plurality of OSes; and a controller configured to identify the first OS displayed on the first display, detect a notification generated in a second OS running in a background of the device among the plurality of OSes when the notification is generated, and convert the generated notification based on a preset format of the first OS. The first display displays the converted notification.

In the device according to an embodiment, the first display displays the first OS and a third OS, and the controller selects the first OS from between the first OS and the third OS when the notification is generated and converts the generated notification based on the preset format of the selected first OS.

In the device according to an embodiment, the controller identifies the first OS and the third OS and selects the first OS based on a type of the notification when the notification is generated in the second OS.

In the device according to an embodiment, the controller selects the first OS based on preset priority information indicating a priority of an OS in which the generated notification is displayed.

In the device according to an embodiment, the controller divides a screen area of the first display and displays the first OS and the third OS in a first window and a second window, respectively, which are obtained by dividing the screen area.

In the device according to an embodiment, the controller selects the first OS based on a complexity of each of the first window and the second window.

In the device according to an embodiment, the controller stops displaying the third OS in the second window, runs the third OS in the background of the device, and converts the generated notification based on the preset format of the first OS when the notification is generated in at least one of the second OS and the third OS.

The device according to an embodiment further includes a second display configured to display a fourth OS. The controller selects the first OS from between the first OS and the fourth OS when the notification is generated and converts the generated notification based on the preset format of the selected first OS.

In the device according to an embodiment, the controller detects the second display and controls the second display to display the fourth OS running in the background of the device when the second display is detected.

In the device according to an embodiment, the controller identifies types of the first display and the second display and selects the first OS displayed on the selected first display based on the identified types of the displays.

In the device according to an embodiment, the controller selects the first OS based on a complexity of each of the first display and the second display.

In the device according to an embodiment, the second display stops displaying the fourth OS, and the controller executes the fourth OS in the background of the device and converts the generated notification based on the preset format of the first OS when the notification is generated in the second OS and the fourth OS.

In the device according to an embodiment, the first display displays the second OS when the first OS stops being displayed, and the controller displays a notification generated in the first OS on the first display on which the second OS is displayed.

DESCRIPTION OF THE DRAWINGS

FIG. 1 is a conceptual diagram for describing a method of displaying a notification on a device with a plurality of operating systems (OSes) installed therein according to an embodiment.

FIG. 3 is a diagram for describing a method of displaying a notification generated in a second OS running in the background of a device on a first display according to an embodiment.

FIG. 8 is a flowchart for describing a method of displaying a notification running in the background of a device when one of a plurality of OSes displayed on a first display of the device according to an embodiment stops being displayed.

FIG. 10 is a flowchart for describing a method of displaying a notification running in the background of a device when one of a plurality of OSes displayed on a first display and a second display of the device according to an embodiment stops being displayed.

FIGS. 11A and 11B are diagrams for describing a method of displaying a notification of an OS running in the background of a device when one of a plurality of OSes displayed on a first display and a second display of the device according to an embodiment stops being displayed.

FIGS. 15A and 15B are diagrams for describing a method of displaying a notification generated in an OS running in the background of a device when a plurality of OSes are displayed by adding a second display to a device according to an embodiment.

MODE OF THE INVENTION

Figure 2:
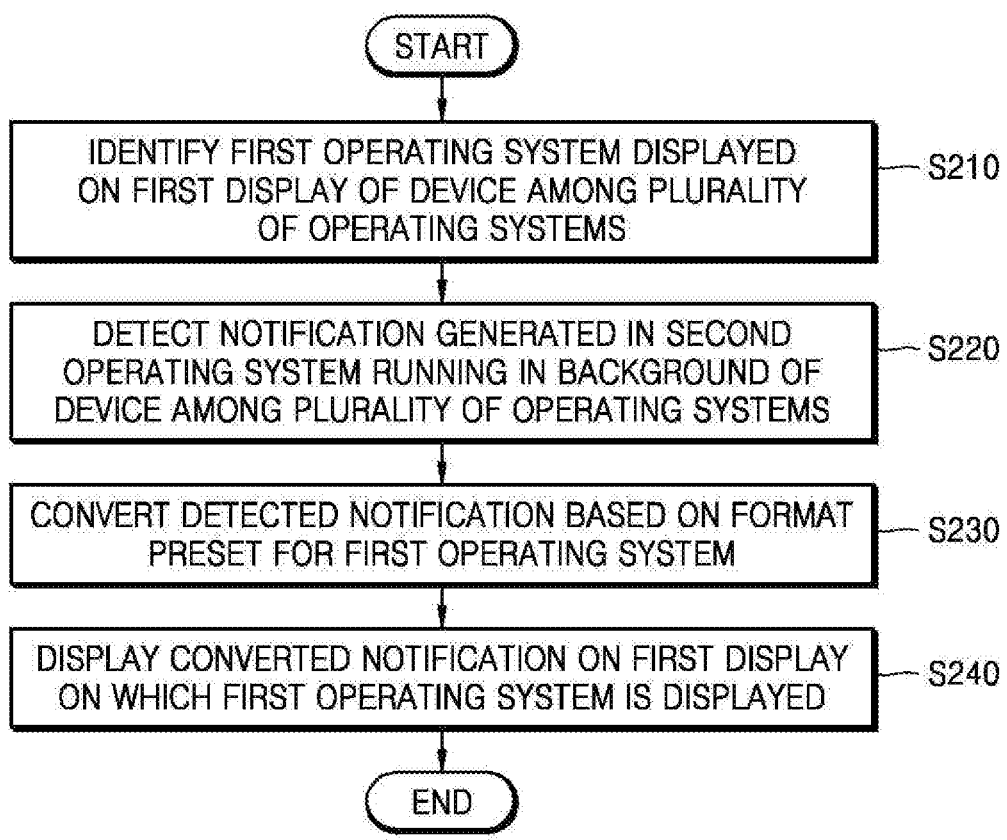
FIG. 2 is a flowchart for describing a method of displaying a notification on a device with a plurality of OSes installed therein according to an embodiment.

Terms used herein will be briefly described, and exemplary embodiments will be described in detail below.

General and widely-used terms have been employed herein in consideration of functions provided in the present invention, and may vary according to an intention of one of ordinary skill in the art, a precedent, or the emergence of new technologies. Additionally, in some cases, the applicant may arbitrarily select specific terms and in such a case, the applicant will provide the meaning of the terms in the description of the exemplary embodiments. Accordingly, the terms used herein should be defined on the basis of the meaning of the terms and the content of the present disclosure, instead of the names of the terms.

Furthermore, when one part is referred to as "comprising" (or "including" or "having") other elements, it should be understood that it can comprise (or include or have) only those elements or other elements as well as those elements unless specifically described otherwise. Moreover, each of terms such as "unit" and "module" used herein denotes an element for performing at least one function or operation, and may be implemented in hardware, software or a combination of hardware and software.

Hereinafter, exemplary embodiments will be fully described with reference to the accompanying drawings in such a way that those skilled in the art can easily carry out the embodiments. The exemplary embodiments may, however, be embodied in many different forms and are not to be construed as being limited to the embodiments set forth herein. In the accompanying drawings, portions irrelevant to the description of the exemplary embodiments will be omitted for clarity. Moreover, like reference numerals refer to like elements throughout this disclosure.

A device described herein may include a digital television (TV), a desktop computer, a mobile phone, a smartphone, a tablet personal computer (PC), a laptop computer, a digital broadcasting terminal, a personal digital assistant (PDA), a portable multimedia player (PMP), a navigation system, etc.

An operating system (OS) refers to a program that enables a user to use a device by controlling hardware and software of the device. An OS may function as an interface between hardware and application programs and may manage computer resources, such as a central processing unit (CPU), a main memory device, an input/output device, etc. Examples of the OS may include Android, Windows, Mac, TIZEN, Unix, and Linux.

An application refers to software developed to enable a user to perform a specific task using a device. For example, the application may include an email application, a messenger application, a schedule management application, a document editor application, etc. Also, the application may be composed of instructions needed to perform a specific task. Here, the instructions composing the application may be different depending on the type of OS. For example, a first messenger application that is set to run on a first OS cannot run on a second OS.

A notification may be generated when an event occurs in an application installed in a device. Here, the event may include an acquisition or reception of new data by an application running in the device or a completion of a task that was processed by an application. However, this is merely an embodiment, and thus the event is not limited thereto. As another example, a version update of an application may also be an example of the event. A notification may be output to a device in the form of at least one of text, image, video, and sound.

Hereinafter, the present invention will be described in detail with reference to the accompanying drawings.

FIG. 1 is a conceptual diagram for describing a method of displaying a notification on a device 100 having a plurality of OSes 10 and 20 installed therein according to an embodiment.

The plurality of OSes 10 and 20 are installed in the device 100 according to an embodiment. For example, a first OS 10 and a second OS 20 may be installed in the device 100. However, this is merely an example. Two or more OSes may be installed in the device 100.

The device 100 according to an embodiment may store applications running on each of the plurality of OSes. For example, the device 100 may store a first email application, a first messenger application, and the like which are running on the first OS. Also, the device 100 may store a second email application, a second messenger application, a second document editor application, and the like which are running on the second OS. Here, at least one first application running on the first OS 10 and at least one second application running on the second OS 20 may have different types and formats of instructions composing each of the applications.

The device 100 according to an embodiment may display the first OS 10 on a first display 110. Here, the device 100 displaying the first OS 10 on the first display 110 denotes that the device 100 displays, on the first display 110, data output by running the first application on the first OS 10.

According to another embodiment, the device 100 may display two or more OSes on the first display 110. This will be described below in more detail with reference to FIG. 5. According to still another embodiment, the device 100 may display two or more OSes on each of two or more displays. This will be described below in more detail with reference to FIG. 7.

Meanwhile, the device 100 according to an embodiment may enable the second OS 20 to run in the background of the device 100. Here, the second OS 20 may be one of the plurality of OSes installed in the device 100. The second OS 20 running in the background of the device 100 may not be displayed on the first display 110.

The device 100 according to an embodiment may detect a notification 22 generated in the second OS 20. For example, when an event occurs in at least one second application running on the second OS 20, the notification 22 may be generated. Since the notification 22 is generated in the second OS 20 that is not displayed on the first display 110, the device 100 may convert the generated notification 22 on the basis of a format preset for the first OS 10. Here, an operation of converting the notification 22 refers to an operation of converting a format of data composing the notification 22.

The device 100 according to an embodiment may display a converted notification 12 on the first display 110. For example, the device 100 may display the converted notification 12 at a preset position in a screen area of the first display 110. As another example, the device 100 may display the converted notification 12 in an area with low complexity out of the screen area of the first display 110. According to an embodiment, the complexity may be determined depending on the number of execution windows that are displayed in the screen area when an application runs on the device 100. For example, as the number of execution windows displayed in the screen area decreases, the complexity may decrease. Examples of the execution windows may include a document editor window that is output when a document editor application is executed, a web browser window that is output when a web browser application is executed, etc.

FIG. 2 is a flowchart for describing a method of displaying a notification on the device 100 with a plurality of OSes installed therein according to an embodiment.

In step S210, the device 100 identifies the first OS 10 displayed on the first display 110 of the device 100 from among a plurality of OSes.

The device 100 according to an embodiment may run the plurality of OSes.

For example, in order to run the plurality of OSes, the device 100 may run a virtual machine that provides a virtual computing environment on the first OS. The virtual machine indicates a virtual computing execution environment that is generated using allocated hardware resources of a device. The virtual machine may include a second OS and at least one second application that may run on the second OS. The device may run the second OS 20 as an application while running the first OS 10 as a host OS.

As another example, the device 100 may create virtual machines, which are a plurality of stand-alone environments. Each of the created virtual machines may include an independent OS and an application running on the OS. For example, a first virtual machine may include the first OS 10 and a first application that may run on the first OS. Also, a second virtual machine may include the second OS 20 and a second application that may run on the second OS.

The device 100 according to an embodiment may identify the first OS 10 being displayed on the first display 110 from among the plurality of OSes. For example, the device 100 may identify the first OS 10 being displayed on the first display 110 as Android.

In step S220, the device 100 detects the notification 22 generated in the second OS 20 that is running in the background of the device 100 among the plurality of OSes. The second OS 20 running in the background may be an OS that is executed by the virtual machine of the device 100 but not displayed on the first display 110.

When an event occurs in the second application running on the second OS 20, a notification may be generated to provide information regarding the event to a user. For example, when a new email is received through an email application running on a Windows OS, an email arrival notification may be generated. The device 100 may detect the email arrival notification generated in the second OS.

In step S230, when the notification 22 is generated, the device 100 converts the generated notification 22 on the basis of a preset format of the first OS 10.

According to an embodiment, information regarding the notification generated in the second OS may be delivered to the first OS. In order to display the generated notification 22 on the first display 110, the device may convert the notification 22 on the basis of the preset format of the first OS 10 displayed on the first display 110. For example, the device 100 may change at least one of text, image, video, and sound composing the notification 22 according to a format provided by the first OS.

In step S240, the device 100 displays the converted notification 12 on the first display 110 on which the first OS 10 is displayed.

The device 100 according to an embodiment may display the converted notification 12 at a preset position in a screen area of the first display 110. For example, the device 100 may display the converted notification 12 at an upper left corner of the screen area of the first display 110.

As another example, the device 100 may display the converted notification 12 on the first display 110 on the basis of a complexity of the first display 110. An execution window of the first application running on the first OS 10 may be displayed in the screen area of the first display 110. The device 100 may determine the complexity of the first display 110 on the basis of the types, number, positions, and display forms of execution windows displayed in the screen area of the first display 110.

As still another example, the device 100 may display the converted notification 12 on the first display 110 on the basis of the type of converted notification 12. For example, when a notification is generated in an email application, the device 100 may display the converted notification at an upper left corner of the first display 110. Also, when a notification is generated in a messenger application, the device 100 may display the converted notification at an upper right corner of the first display 110.

FIG. 3 is a diagram for describing a method of displaying a notification generated in a second OS running in the background of the device 100 on the first display 110 according to an embodiment.

The device 100 according to an embodiment may run a plurality of OSes 310, 320, and 330. Referring to an OS structure 300 running on the device 100, OS A 310 is a host OS, which is a default OS of the device 100. Also, OS B 320 and OS C 330 are each a guest OS, which may run in the same application execution manner as OS A 310. However, this is merely an example of method of running the plurality of OSes 310, 320, 330 on the device 100. As another example, the device 100 may store the plurality of OSes 310, 320, and 330 in a plurality of respective virtual machines and run the OSes 310, 320, and 330.

OS A 310 may be displayed on the first display 110 of the device 100. According to an embodiment, an OS to be displayed on the first display 110 may be determined according to a user's selection. Also, at least one of OS B 320 and OS C 330 may run in the background of the device 100. According to an embodiment, OS B 320 and OS C 330 which are running in the background may not be displayed on the first display 110 of the device 100. The device 100 according to an embodiment may detect a notification 322 generated in OS B 320 running in the background of the device 100. For example, when a message is received in messenger application B running on OS B 320, the notification 322, which indicates that the message is received, may be generated.

Also, the device 100 may display the generated notification 322 on the first display 110 on which OS A 310 is displayed. The device 100 according to an embodiment may convert the generated notification 322 on the basis of a preset format of OS A 310. For example, when a messenger icon image is included in the notification 322 of OS B 320, and a messenger icon image and text indicating a caller and a reception time are included in the preset format of OS A 310, the device 100 may add the text indicating a caller and a reception time to the notification 322 and then convert the notification 322. The device 100 according to an embodiment may display a converted notification 312 at a preset position in the screen area of the first display 110. For example, the device 100 may display the converted notification 312 at the upper left corner of the screen area. As another example, the device 100 may display the converted notification 312 in an area having a small number of application execution windows which are displayed on the basis of a complexity of the first display 110.

Figure 4:
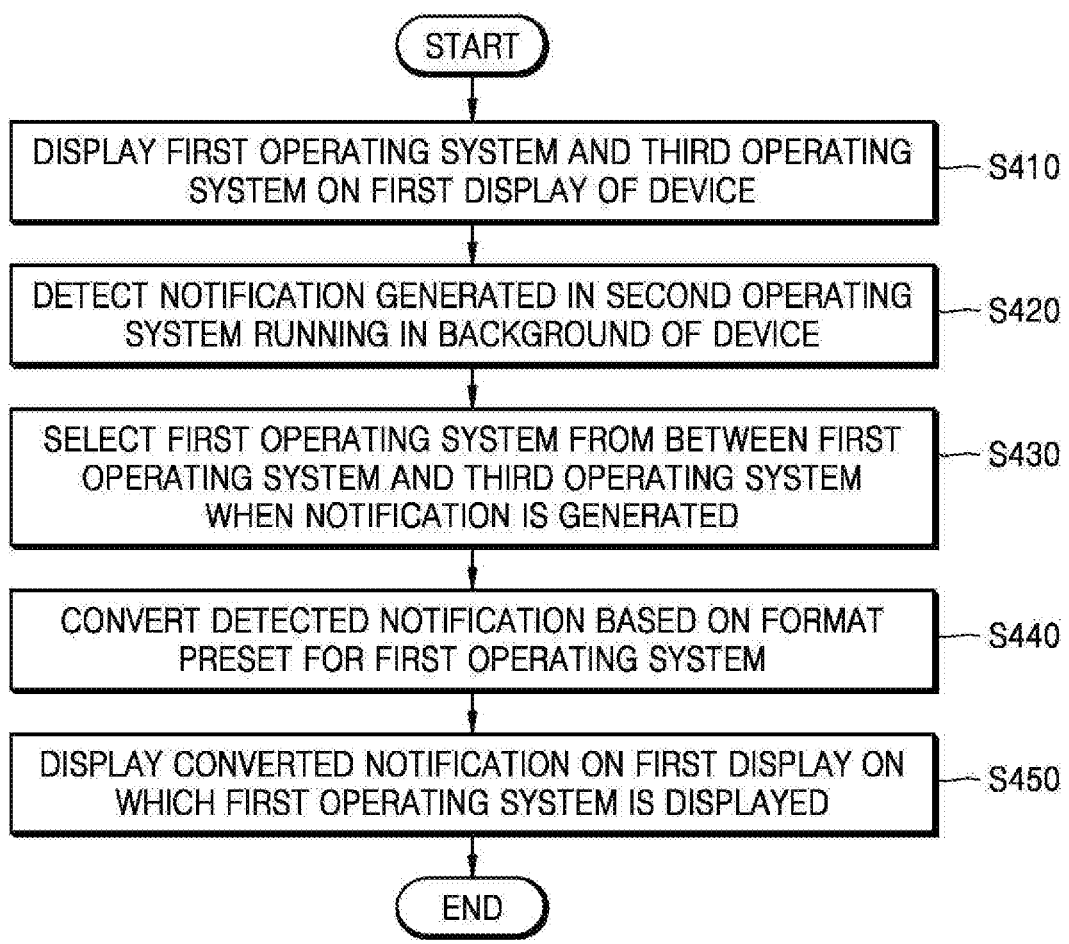
FIG. 4 is a flowchart for describing a method of displaying a notification generated in a second OS when a first OS and a third OS are displayed on a first display of a device according to an embodiment.

FIG. 4 is a flowchart for describing a method of displaying a notification generated in a second OS when a first OS and a third OS are displayed on the first display 110 of the device 100 according to an embodiment.

In step S410, the device 100 may display the first OS and the third OS on the first display 110.

The device 100 according to an embodiment may divide a screen area of the first display 110. The device 100 may display the first OS and the third OS in a first window and a second window, which are obtained by dividing the screen area, respectively.

The device 100 according to an embodiment may select at least some OSes to be displayed on the screen area from among a plurality of OSes installed therein. For example, the device 100 may select an OS according to a preset priority that is a criterion for selecting an OS to be displayed from among the plurality of OSes. Here, the preset priority is a ranking value of an OS displayed on a window. This embodiment may assume that the first OS, the second OS, and the third OS installed in the device 100 have a first ranking, a third ranking, and a second ranking, respectively. When two windows are created in the first display 110, the device 100 may display the first OS and the third OS in the first window and the second window, respectively.

As another example, the device 100 may receive a selection input from a user and display an OS corresponding to the received selection input in a window of the first display 110. For example, when the device 100 receives a selection input which selects the first OS and the third OS from the user, the device 100 may display the first OS and the third OS in the first window and the second window, respectively.

In this case, the types of OSes to be displayed in windows may be selected according to the selection input of the user. For example, the device 100 may display the third OS in the first window and display the first OS in the second window on the basis of the selection input of the user.

In step S420, the device 100 may detect a notification generated in the second OS running in the background of the device 100.

According to an embodiment, when an event occurs in the second application running on the second OS, a notification may be generated to provide information regarding the event to the user. Here, the second OS is merely an example for describing an OS running in the background of the device 100. The plurality of OSes may run in the background of the device 100.

Step S420 may correspond to step S220, which has been described above with reference to FIG. 2.

In step S430, the device 100 may select the first OS from between the first OS and the third OS when the notification is generated.

The device 100 according to an embodiment may select an OS for displaying the generated notification from among the plurality of OSes displayed on the display 110. For example, the device 100 may select the first OS with a highest priority on the basis of preset priority information for selecting an OS in which the notification is to be displayed.

As another example, the device 100 may select the first OS on the basis of a complexity of each of the first window and the second window in which the first OS and the third OS are respectively displayed. The complexity may be determined depending on the number of execution windows that are displayed in a screen area when an application runs on the device 100. As the number of execution windows displayed in the window decreases, the complexity may decrease. For example, the device 100 may select the first OS displayed in the first window with a lower complexity than the second window.

As still another example, an OS in which the generated notification is to be displayed may be preset in the device 100. The device 100 may select the first OS preset for the second OS when the notification is generated in the second OS.

As still another example, the device 100 may select the OS in which the generated notification is to be displayed on the basis of the type of application in which the notification is generated. For example, when the notification is generated in a messenger application of the second OS, the device 100 may select the first OS preset for the messenger application. When the notification is generated in an email application, the device 100 may select the third OS preset for the email application.

In step S440, the device 100 may convert the generated notification on the basis of a format preset for the selected first OS.

According to an embodiment, in order to display the generated notification on the first display 110, the device 100 may convert the notification on the basis of the preset format of the first OS displayed on the first display 110. The device 100 may change at least one of text, image, video, and sound composing the notification according to a format provided by the first OS. Here, the format may indicate the type, arrangement, and form of data composing the format. However, this is merely an embodiment, and the present invention is not limited thereto.

For example, the device 100 may change the type of data composing the generated notification. For the messenger application of the second OS, a notification that is generated when a message is received may include text indicating a sender and a title of the message and a profile photograph image of the sender. Meanwhile, the preset format of the selected first OS may not include the text indicating the title of the message. The device 100 may convert the notification such that the sender of the message and the profile photograph image of the sender are included by deleting the text indicating the title that is included in the generated notification.

As another example, the device 100 may change an arrangement of data composing the generated notification. For the email application of the second OS, a notification that is generated when an email is received may be set such that text indicating a sender and a title of the email are sequentially arranged. Meanwhile, the preset format of the selected first OS may be set such that the text indicating the title and the sender of the email are sequentially arranged. The device 100 may convert the notification such that the order of the sequential arrangement of the text indicating the sender the title of the email is changed in the generated notification.

As still another example, the device 100 may change the type of data composing the generated notification. For the email application of the second OS, a notification that is generated when an email is received may include text indicating a sender of the email and a photograph image of the sender. Meanwhile, the preset format of the selected first OS may include text indicating the sender and a title of the email. The device 100 may convert the notification by removing the photograph image of the sender from the generated notification and adding text indicating the title of the email to the generated notification.

However, the operation of converting the above-described notification is merely an example for describing the present invention, and the present invention is not limited thereto.

In step S450, the device 100 may display the converted notification on the first display 110 on which the first OS is displayed.

The device 100 according to an embodiment may display the converted notification at a preset position in the first window of the first display 110. As another example, the device 100 may display the converted notification at the determined position in the first window on the basis of a complexity of the first window. As still another example, the device 100 may display the converted notification at the determined position in the first window on the basis of the type of converted notification.

Meanwhile, step S450 may correspond to step S240, which has been described above with reference to FIG. 2.

Figure 5:
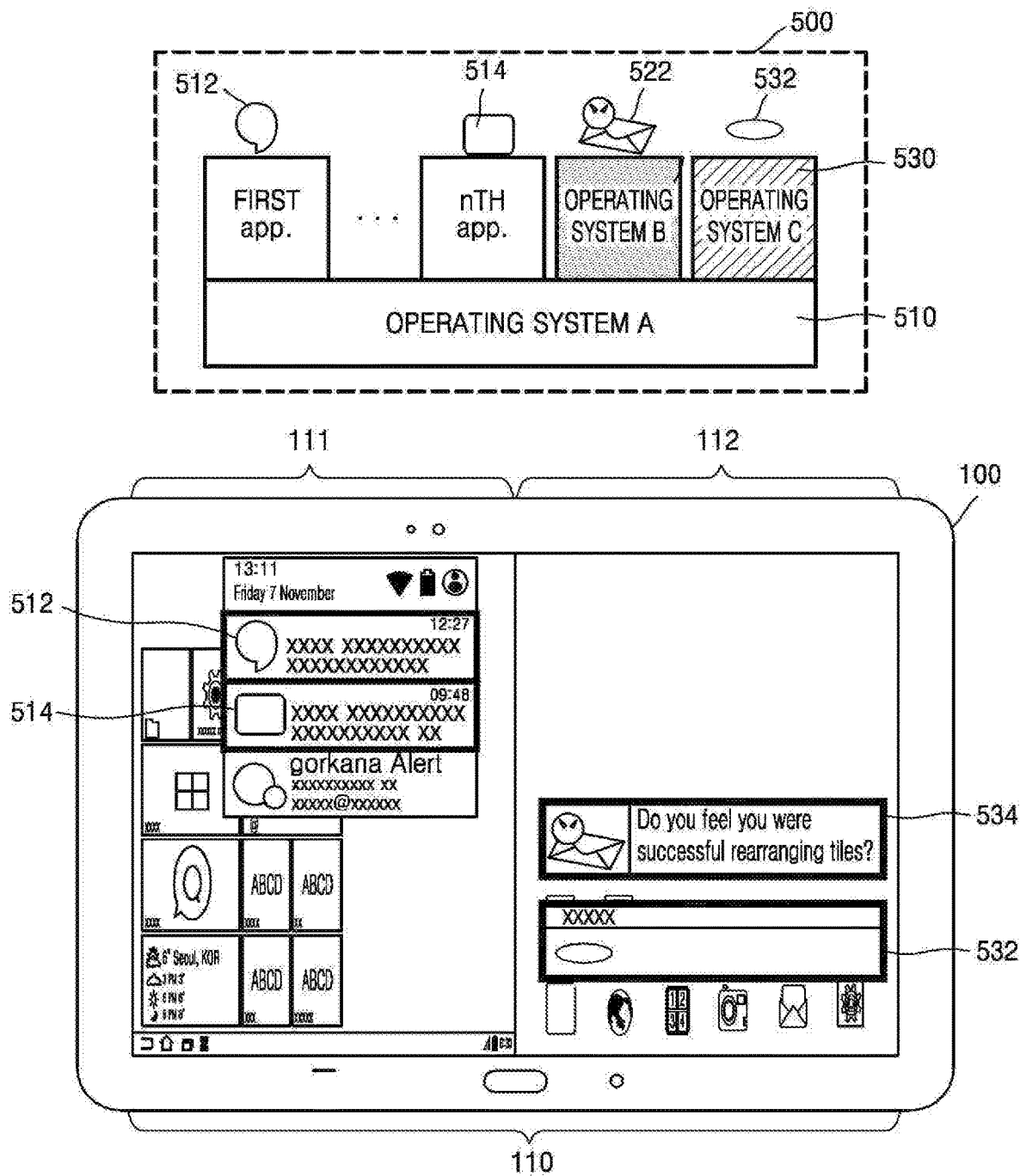
FIG. 5 is a diagram for describing a method of displaying a notification generated in an OS running in the background when a plurality of OSes are displayed on a first display of a device according to an embodiment.

FIG. 5 is a diagram for describing a method of displaying a notification 522 generated in an OS 520 running in the background when a plurality of OSes 510 to 530 are displayed on a first display 110 of a device 100 according to an embodiment.

The device 100 according to an embodiment may run the plurality of OSes 510, 520, and 530. Referring to an OS structure 500 running on the device 100, among the plurality of OSes 510, 520, and 530, OS A 510 is a host OS, and OS B 520 and OS C 530 are each a guest OS. Here, the method of operating the plurality of OSes 510, 520, and 530 may be the same as described above with reference to FIG. 3.

The device 100 according to an embodiment may divide a screen area of the first display 110 to create a first window 111 and a second window 112. The device 100 may display different OSes in the first window 111 and the second window 112. For example, OS A 510 may be displayed in the first window 111, and OS C 530 may be displayed in the second window 112.

According to an embodiment, an OS to be displayed on the first display 110 may be determined according to a user's selection. As another example, the device 100 may display OS A 510 and OS C 530 on the first display 110 on the basis of priority information regarding the order of OSes to be displayed on the first display 110, which is preset for the device 100.

According to an embodiment, OS B 520 may run in the background of the device 100. OS B 520 which is running in the background may not be displayed on the first display 110 of the device 100.

Meanwhile, when an event occurs in applications of the plurality of OSes 510, 520, and 530 installed in the device 100, notifications 512, 514, 522, and 532 may be generated.

For example, when a message is received in a first messenger application running on OS A 510, a first message notification 512 may be generated. Also, when an email is received in a first email application running on OS A 510, a first email notification 514 may be generated. Also, when an email is received in a second email application running on OS B 520, a second email notification 522 may be generated. Also, when a message is received in a third messenger application running on OS C 530, a third message notification 532 may be generated.

The device 100 according to an embodiment may display the notifications 512 and 514 generated in OS A 510 in the first window 111 in which OS A 510 is displayed. Also, the device 100 may display the notification 532 generated in OS C 530 in the second window 112 in which OS C 530 is displayed.

The device 100 according to an embodiment may convert the second email notification 522 generated in OS B 520 running in the background. The device 100 according to an embodiment may convert the generated second email notification 522 on the basis of a preset format of an OS selected from between OS A 510 and OS C 530. For example, the device 100 may select OS C 530 with low complexity on the basis of a complexity of each of the windows 111 and 112 in which OS A 1310 and OS C 1330 are respectively displayed. Here, the complexity may be determined depending on the number of execution windows that are displayed in the windows when an application runs on the device 100. In FIG. 5, two execution windows may be displayed in the first window 111 when two notifications 512 and 514 are generated in OS A 510. Meanwhile, one execution window may be displayed in the second window 112 when one notification 532 is generated in OS C 530. Here, the complexity of the second window 112, in which a relatively small number of execution windows are displayed compared to the first window 111, may be lower than that of the first window 111. Accordingly, the device 100 may select OS C 530. However, this is merely an embodiment, and the method of selecting the OS for converting the notification by the device 100 is not limited thereto.

The device 100 according to an embodiment may convert the notification 522 generated in OS B 520 on the basis of a preset format of the selected OS C 530. For example, the second email notification 522 of OS B 520 may include text indicating a sender of an email and an email icon image, and the preset format of OS C 530 may include an email icon image, text indicating the sender and a reception time. By adding the text indicating the reception time to the notification 522 generated in OS B 520, the device 100 may convert the notification 522. The device 100 according to an embodiment may display a converted notification 534 at a preset position in the second window 112 of the first display 110. For example, the device 100 may display the converted notification 534 at the center of the second window 112 at which the number of execution windows displayed in the second window 112 is small.

Figure 6:
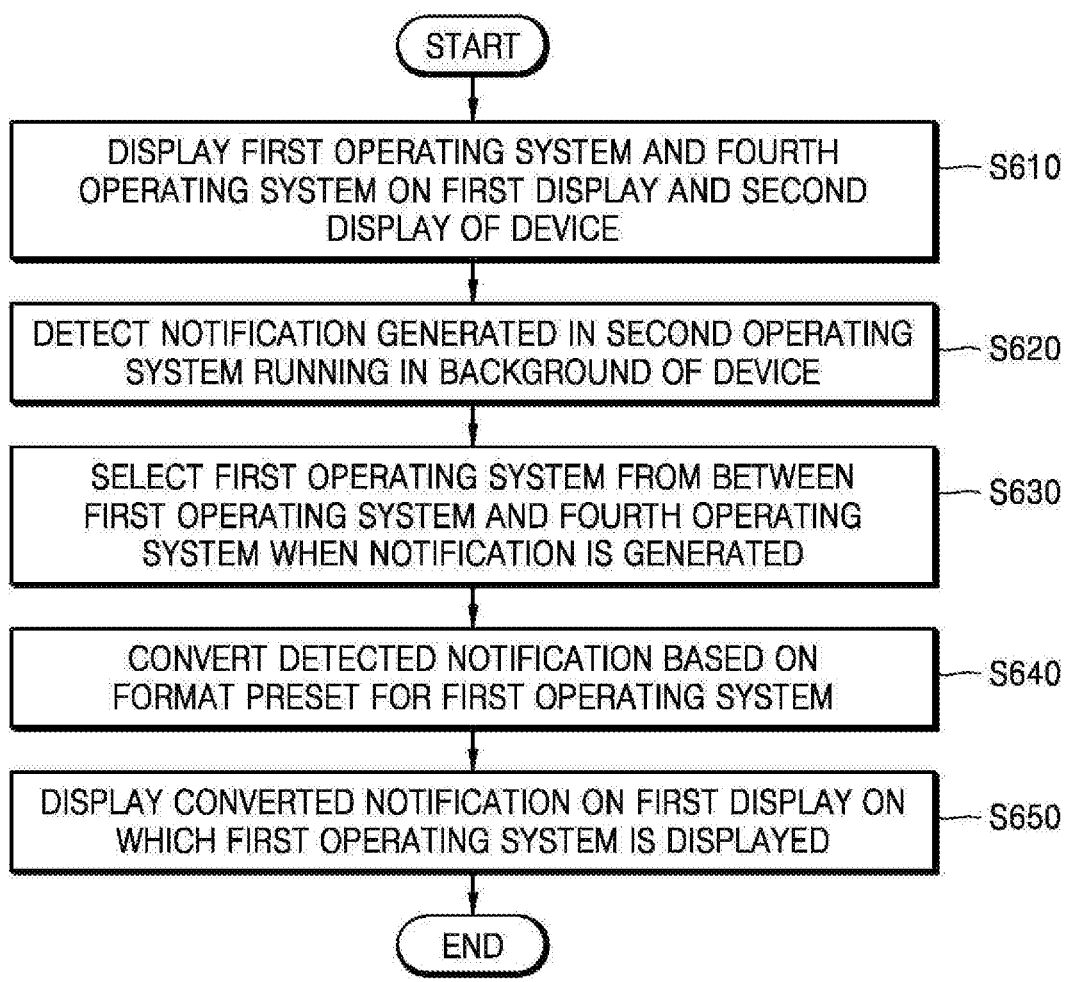
FIG. 6 is a flowchart for describing a method of displaying a notification generated in a second OS when a first OS and a fourth OS are displayed on a first display and a second display of a device according to an embodiment.

FIG. 6 is a flowchart for describing a method of displaying a notification generated in a second OS when a first OS and a fourth OS are displayed on a first display and a second display of the device 100 according to an embodiment.

In step S610, the device 100 may display the first OS and the fourth OS on the first display and the second display, respectively.

The device 100 according to an embodiment may display at least some of a plurality of OSes on a plurality of displays. Here, the plurality of displays may be independently installed in the device 100. As another example, some of the plurality of displays may be installed in the device 100, and the others may be installed in an external device connected with the device 100. As still another example, the plurality of displays may be installed in an external device connected with the device 100.

The device 100 according to an embodiment may select a plurality of OSes to be displayed on the first display and the second display. For example, the device 100 may select an OS according to a preset priority that is a criterion for selecting an OS to be displayed from among the plurality of OSes. Here, the preset priority is a ranking value of an OS displayed on a display. This embodiment may assume that the first OS, a second OS, a third OS, and the fourth OS installed in the device 100 have a first ranking, a third ranking, a fourth ranking, and a second ranking, respectively. For example, the device 100 may display the first OS and the fourth OS on the first display and the second display, respectively.

As another example, the device 100 may receive a selection input from a user and display an OS corresponding to the received selection input on the first display and the second display. For example, when the device 100 receives a selection input which selects the first OS and the fourth OS from the user, the device 100 may display the first OS and the fourth OS on the first window and the second window, respectively.

In this case, the types of OSes to be displayed in windows may be selected according to the selection input of the user. For example, the device 100 may display the fourth OS on the first display and may display the first OS on the second display on the basis of the selection input of the user.

In step S620, the device 100 may detect a notification generated in the second OS running in the background of the device 100.

According to an embodiment, when an event occurs in the second application running on the second OS, a notification may be generated to provide information regarding the event to the user. Here, the second OS is merely an example for describing an OS running in the background of the device 100. The plurality of OSes may run in the background of the device 100.

Step S620 may correspond to step S220, which has been described above with reference to FIG. 2.

In step S630, the device 100 may select the first OS from between the first OS and the fourth OS when the notification is generated.

The device 100 according to an embodiment may select an OS for displaying the generated notification from between the first OS and the fourth OS. For example, the device 100 may select the first OS with a highest priority on the basis of preset priority information for selecting an OS in which the notification is to be displayed.

As another example, the device 100 may select the first OS on the basis of a complexity of each of the first display and the second display in which the first OS and the fourth OS are displayed. The complexity may be determined depending on the number of execution windows that are displayed in a window when an application runs on the device 100. As the number of execution windows displayed in the window decreases, the complexity may decrease. For example, the device 100 may select the first OS displayed in the first display with a lower complexity than the second display.

As still another example, an OS in which the generated notification is to be displayed may be preset in the device 100. The device 100 may select the first OS preset for the second OS when the notification is generated in the second OS.

As still another example, the device 100 may select the OS in which the generated notification is to be displayed on the basis of the type of application in which the notification is generated. For example, when the notification is generated in a messenger application of the second OS, the device 100 may select the first OS preset for the messenger application. When the notification is generated in an email application, the device 100 may select the fourth OS preset for the email application.

In step S640, the device 100 may convert the generated notification on the basis of a format preset for the selected first OS.

According to an embodiment, in order to display the generated notification on the first display 110, the device 100 may convert the notification on the basis of the preset format of the first OS displayed on the first display 110. The device 100 may change at least one of text, image, video, and sound composing the notification according to a format provided by the first OS. Here, the format may indicate the type, arrangement, and form of data composing the format. However, this is merely an embodiment, and the present invention is not limited thereto.

Meanwhile, the method of converting the generated notification on the basis of the preset format of the first OS by the device 100 may correspond to the above-described method with reference to FIG. 4.

In step S650, the device 100 may display the converted notification on the first display 110 on which the first OS is displayed.

The device 100 according to an embodiment may display the converted notification at a preset position in a screen area of the first display 110. As another example, the device 100 may display the converted notification on the first display 110 on the basis of the complexity of the first display 110. As still another example, the device 100 may display the converted notification on the first display 110 on the basis of the type of converted notification.

Meanwhile, step S650 may correspond to step S240, which has been described above with reference to FIG. 2.

Figure 7:
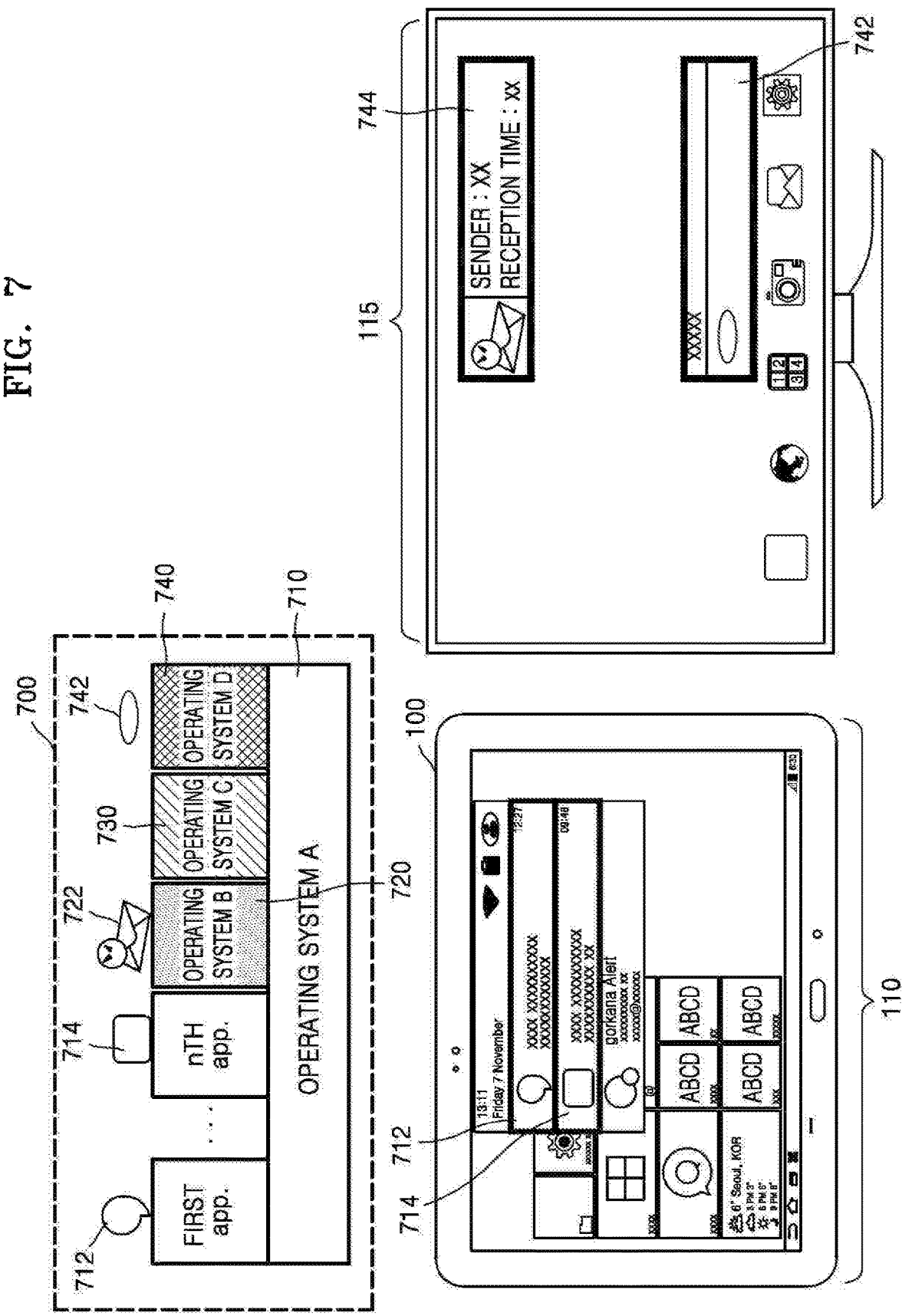
FIG. 7 is a diagram for describing a method of displaying a notification generated in an OS running in the background when a plurality of OSes are displayed on a first display and a second display of a device according to an embodiment.

FIG. 7 is a diagram for describing a method of displaying a notification 722 generated in an OS 720 running in the background when a plurality of OSes 710 to 740 are displayed on the first display 110 and a second display 115 of the device 100 according to an embodiment.

The device 100 according to an embodiment may run the plurality of OSes 710, 720, 730, and 740. Referring to an OS structure 700 running on the device 100, among the plurality of OSes 710, 720, 730, and 740, OS A 710 is a host OS, and OS B 720, OS C 730, and OS D 740 are each a guest OS. Here, the method of operating the plurality of OSes 710, 720, 730, and 740 may be the same as described above with reference to FIG. 3.

According to an embodiment, the first display 110 may be installed in the device 100, and the second display 115 may be installed in an external device connected with the device 100. The device 100 may display different OSes on the first display 110 and the second display 115. For example, OS A 710 may be displayed on the first display 110, and OS D 740 may be displayed on the second display 115.

According to an embodiment, OSes to be displayed on the first display 110 and the second display 115 may be determined according to a user's selection. As another example, the device 100 may respectively display OS A 710 and OS D 740 on the first display 110 and the second display 115 on the basis of priority information regarding the order of OSes to be displayed on the first display 110 and the second display 120, which is preset for the device 100.

According to an embodiment, OS B 720 and OS C 730 may run in the background of the device 100. OS B 720 and OS C 730 running in the background of the device 100 may not be displayed on the first display 110 and the second display 115.

Meanwhile, when an event occurs in applications of the plurality of OSes 710, 720, 730, and 740 installed in the device 100, notifications 712, 714, 722, and 742 may be generated.

For example, when a message is received in a first messenger application running on OS A 710, a first message notification 712 may be generated. Also, when an email is received in a first email application running on OS A 710, a first email notification 714 may be generated. Also, when an email is received in a second email application running on OS B 720, a second email notification 722 may be generated. Also, when a message is received in a fourth messenger application running on OS D 740, a fourth message notification 742 may be generated.

The device 100 according to an embodiment may display the notifications 712 and 714 generated in OS A 710 on the first display 110 on which OS A 714 is displayed. Also, the device 100 may display the notification 740 generated in OS D 740 on the second display 115 on which OS D 740 is displayed.

The device 100 according to an embodiment may convert the second email notification 722 generated in OS B 720 running in the background. The device 100 may display a converted notification 744 on at least one of the first display 110 on which OS A 710 is displayed and the second display 115 on which OS D 740 is displayed. For example, the device 100 may select OS D 740 to display the converted notification 744 on the basis of a complexity of each of the displays 110 and 115 on which OS A 710 and OS D 740 are respectively displayed.

Here, the complexity may be determined depending on the number of execution windows that are displayed in a screen area when an application runs on the device 100. For example, two execution windows may be displayed on the first display 110 when two notifications 712 and 714 are generated in OS A 710.

Meanwhile, one execution window may be displayed on the second display 115 when one notification 742 is generated in OS D 740. Here, the complexity of the second display 115, on which a relatively small number of execution windows are displayed compared to the first display 110, may be lower than that of the first display 110. Accordingly, the device 100 may select OS D 740 displayed on the second display 115. However, this is merely an embodiment, and the method of selecting the OS for converting the notification by the device 100 is not limited thereto.

The device 100 according to an embodiment may convert the notification 722 generated in OS B 520 on the basis of the preset format of the selected OS D 740. For example, the second email notification 722 of OS B 720 may include text indicating a sender of an email and an email icon image, and the preset format of OS D 740 may include an email icon image and text indicating the sender and a reception time. By adding the text indicating the reception time to the notification 722 generated in OS B 720, the device 100 may convert the notification 722.

The device 100 according to an embodiment may display the converted notification 744 at a preset position in the second display 115. For example, the device 100 may display the converted notification 744 at an upper right corner, which has a small number of execution windows displayed in a screen area of the second display 115.

FIG. 8 is a flowchart for describing a method of displaying a notification running in the background of the device 100 when one of a plurality of OSes displayed on the first display 110 of the device 100 according to an embodiment stops being displayed.

In step S810, the device 100 may display a first OS and a third OS in a first window and a second window of the first display, respectively.

The device 100 according to an embodiment may divide a screen area of the first display 110. The device 100 may display the first OS and the third OS in the first window and the second window, which are obtained by dividing the screen area, respectively.

Meanwhile, step S810 may correspond to step S410, which has been described above with reference to FIG. 4.

In step S820, the device 100 may stop displaying the third OS in the second window.

The device 100 according to an embodiment may receive a change input for requesting a change of the OS displayed on the first display 110 of the device 100 from a user. Here, the change input may include information regarding the number of windows created in the first display 110, the type of OSes displayed in the windows, etc.

When the device 100 according to an embodiment receives the change input from the user, the device 100 may remove one of the two windows that have already been created. Also, when the window is removed, the device 100 may stop displaying an OS that is displayed in the window. For example, when the second window is removed from the first window and the second window, the device 100 may stop displaying a third OS that is displayed in the second window.

However, this is merely an embodiment. When the device 100 receives the change input from the user, the device 100 may create an additional window and change an OS displayed in the window.

In step S830, when the device 100 stops displaying the third OS, the device 100 may run the third OS in the background of the device 100.

When the third OS stops being displayed in the device 100 according to an embodiment, only the first OS among the plurality of OSes may be displayed on the first display 110 of the device 100, and a second OS and the third OS may run in the background of the device 100.

In step S840, when a notification is generated in at least one of the second OS and the third OS that are running in the background of the device 100, the device 100 may convert the generated notification on the basis of a preset format of the first OS.

According to an embodiment, the second OS of the device 100 may run a plurality of second applications. When an event occurs in at least one of the plurality of second applications, a notification for informing the user of the event occurrence may be generated. Also, the third OS of the device 100 may run a plurality of third applications. When an event occurs in at least one of the plurality of third applications, a notification for informing the user of the event occurrence may be generated.

Meanwhile, according to an embodiment, the device 100 may convert the notification on the basis of the preset format of the first OS displayed on the first display 110 to display the generated notification on the first display 110. The device 100 may change at least one of text, image, video, and sound composing the notification according to a format provided by the first OS.

Meanwhile, the method of converting the generated notification on the basis of the preset format of the first OS by the device 100 may correspond to the above-described method with reference to FIG. 4.

In step S850, the device 100 may display the converted notification on the first display 110 on which the first OS is displayed.

The device 100 according to an embodiment may display the converted notification at a preset position in a screen area of the first display 110. As another example, the device 100 may display the converted notification on the first display 110 on the basis of a complexity of the first display 110. As still another example, the device 100 may display the converted notification on the first display 110 on the basis of the type of converted notification.

Meanwhile, step S850 may correspond to step S240, which has been described above with reference to FIG. 2.

FIG. 9 is a diagram for describing a method of displaying a notification 932 generated in an OS 920 or 930 running in the background when one of a plurality of OSes 910 to 930 displayed on the first display 110 of the device 100 according to an embodiment stops being displayed.

The device 100 according to an embodiment may run the plurality of OSes 910, 920, and 930. Referring to an OS structure 900 running on the device 100, among the plurality of OSes 910, 920, and 930, OS A 910 is a host OS, and OS B 920 and OS C 930 are each a guest OS. Here, the method of operating the plurality of OSes 910, 920, and 930 may be the same as described above with reference to FIG. 3.

Figure 9A:
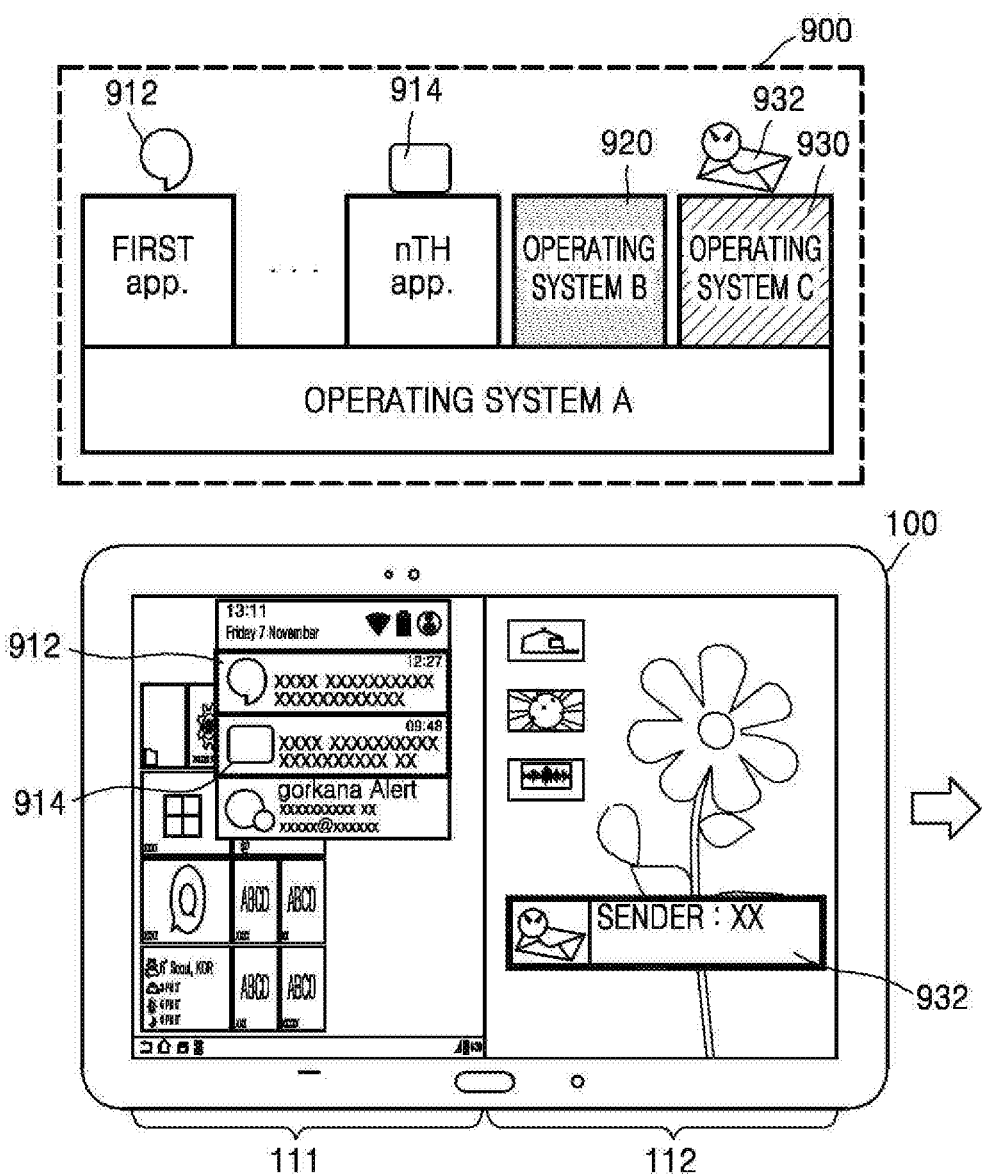
FIGS. 9A and 9B are diagrams for describing a method of displaying a notification generated in an OS running in the background when one of a plurality of OSes displayed on a first display of a device according to an embodiment stops being displayed.

Referring to FIG. 9A, the device 100 according to an embodiment may divide a screen area of the first display 110 to generate the first window 111 and the second window 112. The device 100 may display different OSes in the first window 111 and the second window 112. For example, OS A 910 may be displayed in the first window 111, and OS C 930 may be displayed in the second window 112.

According to an embodiment, OS B 920 may run in the background of the device 100. OS B 920 which is running in the background may not be displayed on the first display 110 of the device 100.

Meanwhile, when an event occurs in applications running on OS A 910 of the device 100 according to an embodiment, notifications 912 and 914 may be generated.

For example, when a message is received in a first messenger application running on OS A 910, a first message notification 912 may be generated. Also, when an email is received in a first email application running on OS A 910, a first email notification 914 may be generated. Also, when an email is received in a third email application running on OS C 930, a third email notification 932 may be generated.

The device 100 according to an embodiment may display the notifications 912 and 914 generated in OS A 910 in the first window 111 in which OS A 910 is displayed. Also, the device 100 may display the notification 932 generated in OS C 930 in the second window 112 in which OS C 930 is displayed.

Figure 9B:
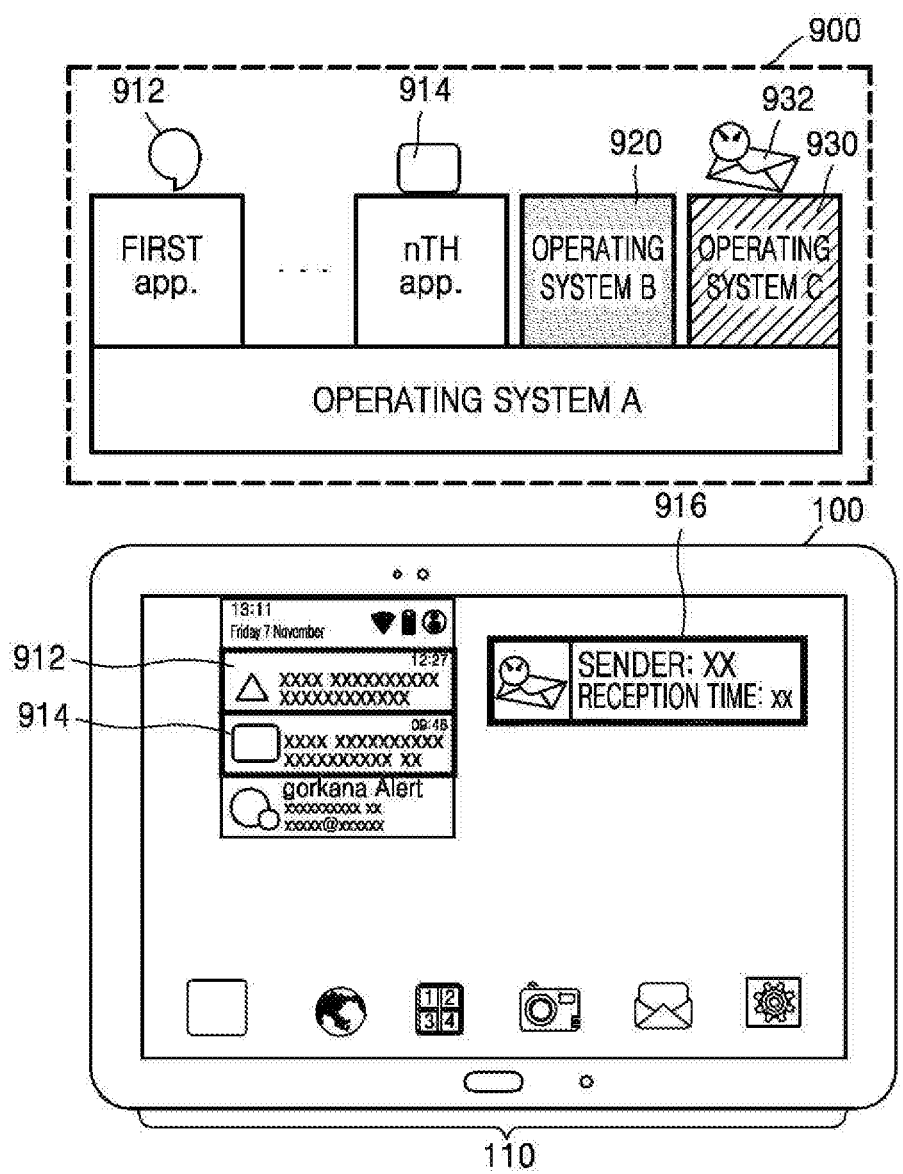

Referring to FIG. 9B, the device 100 according to an embodiment may remove the second window 112 and may stop displaying OS C 930. For example, the device 100 may receive a change input for requesting a change of the OS displayed on the first display 110 of the device 100 from a user. This embodiment assumes that the change input includes a command for removing the second window 112.

When the change input is received from the user, the device 100 may remove the second window 112 that is displayed on the first display 110. Also, when the second window 112 is removed, the device may stop displaying OS C 930 that is displayed in the second window 112.

When the device 100 according to an embodiment stops displaying OS C 930, the device 100 may run OS C 930 in the background of the device 100.

When the third OS stops being displayed in the device 100 according to an embodiment, only OS A 910 among the plurality of OSes 910, 920, and 930 may be displayed on the first display 110 of the device 100, and OS B 920 and OS C 930 may run in the background of the device 100.

Meanwhile, when the second window 112 is removed, the device 100 according to an embodiment may detect the notification 932 generated from OS C 930 running in the background. The device 100 may convert the detected notification 932 on the basis of a format preset for OS A 910 displayed on the first display 110. For example, the third email notification 932 of OS C 930 may include text indicating a sender of an email and an email icon image, and the preset format of OS A 910 may include an email icon image, text indicating the sender and a reception time. By adding the text indicating the reception time to the notification 932 generated in OS C 930, the device 100 may convert the notification 932.

The device 100 according to an embodiment may display a converted notification 916 at a preset position in the first display 110. As another example, the device 100 may display the converted notification 916 at a predetermined position on the basis of a complexity of the first display 110. For example, the device 100 may display the converted notification 916 at an upper right corner, which has a small number of execution windows displayed in the screen area of the first display 110.

FIG. 10 is a flowchart for describing a method of displaying a notification running in the background of the device 100 when one of a plurality of OSes displayed on the first display 110 and the second display 115 of the device 100 according to an embodiment stops being displayed.

In step S1010, the device 100 may display a first OS and a fourth OS on the first display 110 and the second display 115 of the device 100, respectively.

According to an embodiment, a plurality of OSes may be installed in the device 100. The device 100 may display the first OS and the fourth OS among the plurality of OSes on the first display 110 and the second display 115, respectively.

Step S1010 may correspond to step S610, which has been described above with reference to FIG. 6.

In step S1020, the device 100 may stop displaying the fourth OS on the second display 115.

The device 100 according to an embodiment may receive a change input for requesting a change of the OS displayed on the second display 115 of the device 100 from a user. Here, the change input may include information regarding the number of displays on which OSes are displayed, the types of OSes displayed on the displays, etc.

As another example, the device 100 may detect a disconnection from some of a plurality of displays. The device 100 may stop displaying OSes on the displays from which the device 100 is disconnected. For example, when the device 100 is disconnected from the second display 115, the device 100 may stop displaying the fourth OS.

As still another example, the device 100 may stop displaying data on some of the plurality of displays. For example, when the device 100 receives an input for stopping a provision of power to the second display from the user, the device 100 may stop displaying the fourth OS on the second display 115.

In step S1030, when the device 100 stops displaying the fourth OS, the device 100 may run the fourth OS in the background of the device 100.

When the fourth OS stops being displayed in the device 100 according to an embodiment, only the first OS among the plurality of OSes may be displayed on the first display 110 of the device 100, and a second OS, a third OS, and the fourth OS may run in the background of the device 100.

In step S1040, when a notification is generated in at least one of the second OS, the third OS, and the fourth OS that are running in the background of the device 100, the device 100 may convert the generated notification on the basis of a preset format of the first OS.

According to an embodiment, the second OS of the device 100 may run a plurality of second applications. When an event occurs in at least one of the plurality of second applications, a notification for informing the user of the event occurrence may be generated. Also, the third OS of the device 100 may run a plurality of third applications. When an event occurs in at least one of the plurality of third applications, a notification for informing the user of the event occurrence may be generated. Also, the fourth OS of the device 100 may run a plurality of fourth applications. When an event occurs in at least one of the plurality of fourth applications, a notification for informing the user of the event occurrence may be generated.

Meanwhile, according to an embodiment, the device 100 may convert the notification on the basis of the preset format of the first OS displayed on the first display 110 to display the generated notification on the first display 110. The device 100 may change at least one of text, image, video, and sound composing the notification according to a format provided by the first OS.

Meanwhile, the method of converting the generated notification on the basis of the preset format of the first OS by the device 100 may correspond to the above-described method with reference to FIG. 4.

In step S1050, the device 100 may display the converted notification on the first display 110 on which the first OS is displayed.

The device 100 according to an embodiment may display the converted notification at a preset position in a screen area of the first display 110. As another example, the device 100 may display the converted notification on the first display 110 on the basis of a complexity of the first display 110. As still another example, the device 100 may display the converted notification on the first display 110 on the basis of the type of converted notification.

Meanwhile, step S1050 may correspond to step S240, which has been described above with reference to FIG. 2.

FIG. 11 is a diagram for describing a method of displaying notifications 1122 and 1142 of OSes 1120, 1130, and 1140 running in the background of the device 100 when one of a plurality of OSes 1110 to 1140 displayed on the first display 110 and the second display 115 of the device 100 according to an embodiment stops being displayed.

The device 100 according to an embodiment may run the plurality of OSes 1110, 1120, 1130, and 1140. Referring to an OS structure 1100 running on the device 100, among the plurality of OSes 1110, 1120, 1130, and 1140, OS A 1110 is a host OS, and OS B 1120, OS C 1130, and OS D 1140 are each a guest OS. Here, the method of operating the plurality of OSes 1110, 1120, 1130, and 1140 may be the same as described above with reference to FIG. 3.

Referring to FIG. 11A, according to an embodiment, the first display 110 may be installed in the device 100, and the second display 115 may be installed in an external device connected to the device 100. The device 100 may display different OSes on the first display 110 and the second display 115. For example, OS A 1110 may be displayed on the first display 110, and OS D 1140 may be displayed on the second display 115.

Meanwhile, when an event occurs in applications running on OS A 1110 of the device 100 according to an embodiment, notifications 1112 and 1114 may be generated. For example, when a message is received in a first messenger application running on OS A 1110, a first message notification 1112 may be generated. Also, when an email is received in a first email application running on OS A 1110, a first email notification 1114 may be generated.

Also, when an email is received in a second email application running on OS B 1120, a second email notification 1132 may be generated. Also, when a message is received in a fourth messenger application running on OS D 1140, a fourth message notification 1142 may be generated.

The device 100 according to an embodiment may display the notifications 1112 and 1114 generated in OS A 1110 on the first display 110 on which OS A 1110 is displayed. Also, the device 100 may convert the notification 1122 generated in OS B 1120 running in the background according to a format preset for OS D 1140 and may display the converted notification on the second display 115. Here, when OS B 1120 is running in the background of the device 100, the generated notification may be preset such that the generated notification is displayed on the second display 115 on which OS D 1140 is displayed. Also, the device 100 may display the notification 1142 generated in OS D 1140 on the second display 115 on which OS D 1140 is displayed.

Referring to FIG. 11B, the device 100 according to an embodiment may stop displaying OS D 1140 when the device 100 is disconnected from the second display 115.

When the device 100 according to an embodiment stops displaying OS D 1140, the device 100 may run OS D 1140 in the background of the device 100.

When OS D 1140 stops being displayed in the device 100 according to an embodiment, only OS A 1110 among the plurality of OSes 1110, 1120, 1130, and 1140 may be displayed on the first display 110 of the device 100, and OS B 1120, OS C 1130, and OS D 1140 may run in the background of the device 100.

The device 100 according to an embodiment may detect notifications 1122 and 1142 generated in OS B 1120 and OS D 1140, respectively, running in the background of the device 100. The device 100 may convert the detected notifications 1122 and 1142 on the basis of a format preset for OS A 1110 displayed on the first display 110.

For example, the second email notification 1122 of OS B 1120 may include text indicating a sender and a reception time of an email and an email icon image, and the preset format of OS A 1110 may include an email icon image and text indicating the sender. Also, for the second email notification 1122 of OS B 1120, the image is positioned on a right side, and the text is positioned on a left side. For the preset format of OS A 1110, the image is positioned on the left side, and the text is positioned on the right side. By deleting the text indicating the reception time from the second email notification 1122 and changing an arrangement of the text and the image, the device 100 may convert the notification 1122.

Also, the fourth message notification 1142 of OS D 1140 may include a sender of a message, details of the message, and a messenger icon image, and the preset format of OS A 1110 may include a messenger icon image and text indicating the sender. Also, for the fourth messenger notification 1142 of OS D 1140, the image is positioned on the right side, and the text is positioned on the left side. For the preset format of OS A 1110, the image is positioned on the left side, and the text is positioned on the right side. By deleting the text indicating the details from the fourth email notification 1142 and changing an arrangement of the text and the image, the device 100 may convert the notification 1142.

The device 100 according to an embodiment may display converted notifications 1146 and 1148 at a preset position in the first display 110. As another example, the device 100 may display the converted notifications 1146 and 1148 at a predetermined position on the basis of a complexity of the first display 110. For example, the device 100 may display the converted notifications 1146 and 1148 on the right side, which has a small number of application execution windows displayed in a screen area of the first display 110.

Figure 12:
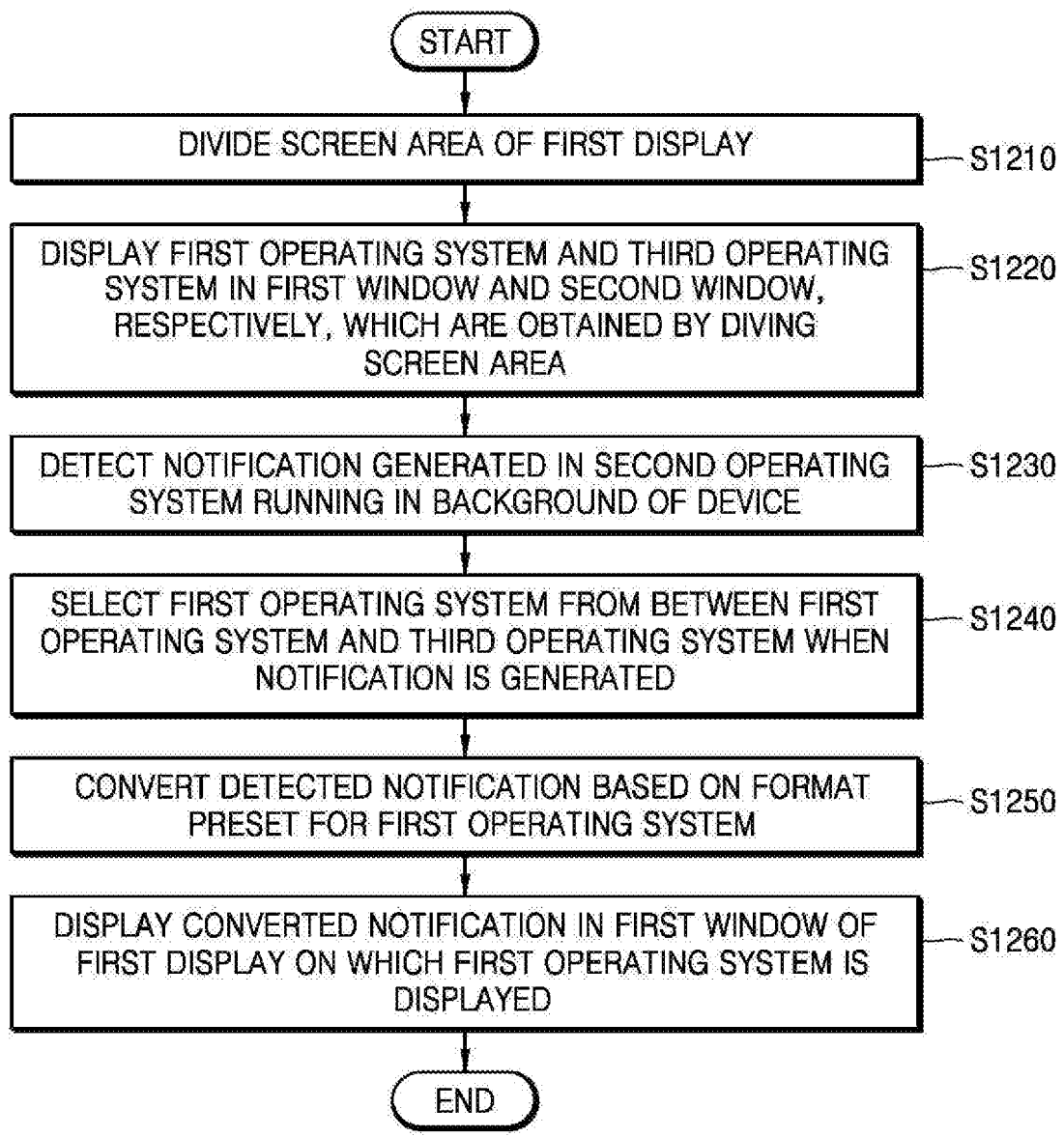
FIG. 12 is a flowchart for describing a method of displaying a notification generated in an OS running in the background of a device when a plurality of OSes are displayed by dividing a screen area of a first display of a device according to an embodiment.

FIG. 12 is a flowchart for describing a method of displaying a notification generated in an OS running in the background of the device 100 when a plurality of OSes are displayed by dividing a screen area of the first display 110 of the device 100 according to an embodiment. In step S1210, the device 100 may divide a screen area of the first display 110.

The device 100 may divide the screen area of the first display 110 on the basis of an input received from a user. When the screen area of the first display 110 is divided, two windows capable of independently displaying OSes may be generated.

In step S1220, the device 100 may display a first OS and a third OS in the first window 111 and the second window 112 of the first display 110, respectively.

The device 100 according to an embodiment may select at least some OSes to be displayed on the screen area from among a plurality of OSes installed therein. For example, the device 100 may select an OS according to a preset priority that is a criterion for selecting an OS to be displayed from among the plurality of OSes. As another example, the device 100 may receive a selection input from the user and display an OS corresponding to the received selection input in a window of the first display 110.

Meanwhile, step S1220 may correspond to step S410, which has been described above with reference to FIG. 4.

In step S1230, the device 100 may detect a notification generated in a second OS running in the background of the device 100.

According to an embodiment, when an event occurs in the second application running on the second OS, a notification may be generated to provide information regarding the event to the user. Here, the second OS is merely an example for describing an OS running in the background of the device 100. The plurality of OSes may run in the background of the device 100.

Meanwhile, step S1230 may correspond to step S420, which has been described above with reference to FIG. 4.

In step S1240, the device 100 may select the first OS from between the first OS and the third OS when the notification is generated.

The device 100 according to an embodiment may select an OS for displaying the generated notification from among the plurality of OSes displayed on the display 110. For example, the device 100 may select the first OS with a highest priority on the basis of preset priority information for selecting an OS in which the notification is to be displayed. As another example, the device 100 may select the first OS on the basis of a complexity of each of the first window and the second window in which the first OS and the third OS are respectively displayed. As still another example, an OS in which the generated notification is to be displayed may be preset in the device 100. As still another example, the device 100 may select the OS in which the generated notification is to be displayed on the basis of the type of application in which the notification is generated.

Meanwhile, step S1240 may correspond to step S430, which has been described above with reference to FIG. 4.

In step S1250, the device 100 may convert the generated notification on the basis of a format preset for the selected first OS.

According to an embodiment, the device 100 may convert the notification on the basis of the preset format of the first OS displayed on the first display 110 to display the generated notification on the first display 110.

Meanwhile, step S1250 may correspond to step S440, which has been described above with reference to FIG. 4.

In step S1260, the device 100 may display the converted notification in the first window 111 of the first display 110 on which the first OS is displayed.

The device 100 according to an embodiment may display the converted notification at a preset position in the first window 111. As another example, the device 100 may display the converted notification at the determined position in the first window 111 on the basis of a complexity of the first window 111. As still another example, the device 100 may display the converted notification at the determined position in the first window 111 on the basis of the type of converted notification.

Meanwhile, step S1260 may correspond to step S450, which has been described above with reference to FIG. 4.

FIG. 13 is a diagram for describing a method of displaying a notification generated in an OS running in the background of the device 100 when a plurality of OSes are displayed by dividing a screen area of the first display 110 of the device 100 according to an embodiment.

The device 100 according to an embodiment may run a plurality of OSes 1310, 1320, and 1330. Referring to an OS structure 1300 running on the device 100, among the plurality of OSes 1310, 1320, and 1330, OS A 1310 is a host OS, and OS B 520 and OS C 1330 are each a guest OS. Here, the method of operating the plurality of OSes 1310, 1320, and 1330 may be the same as described above with reference to FIG. 3.

Figure 13A:
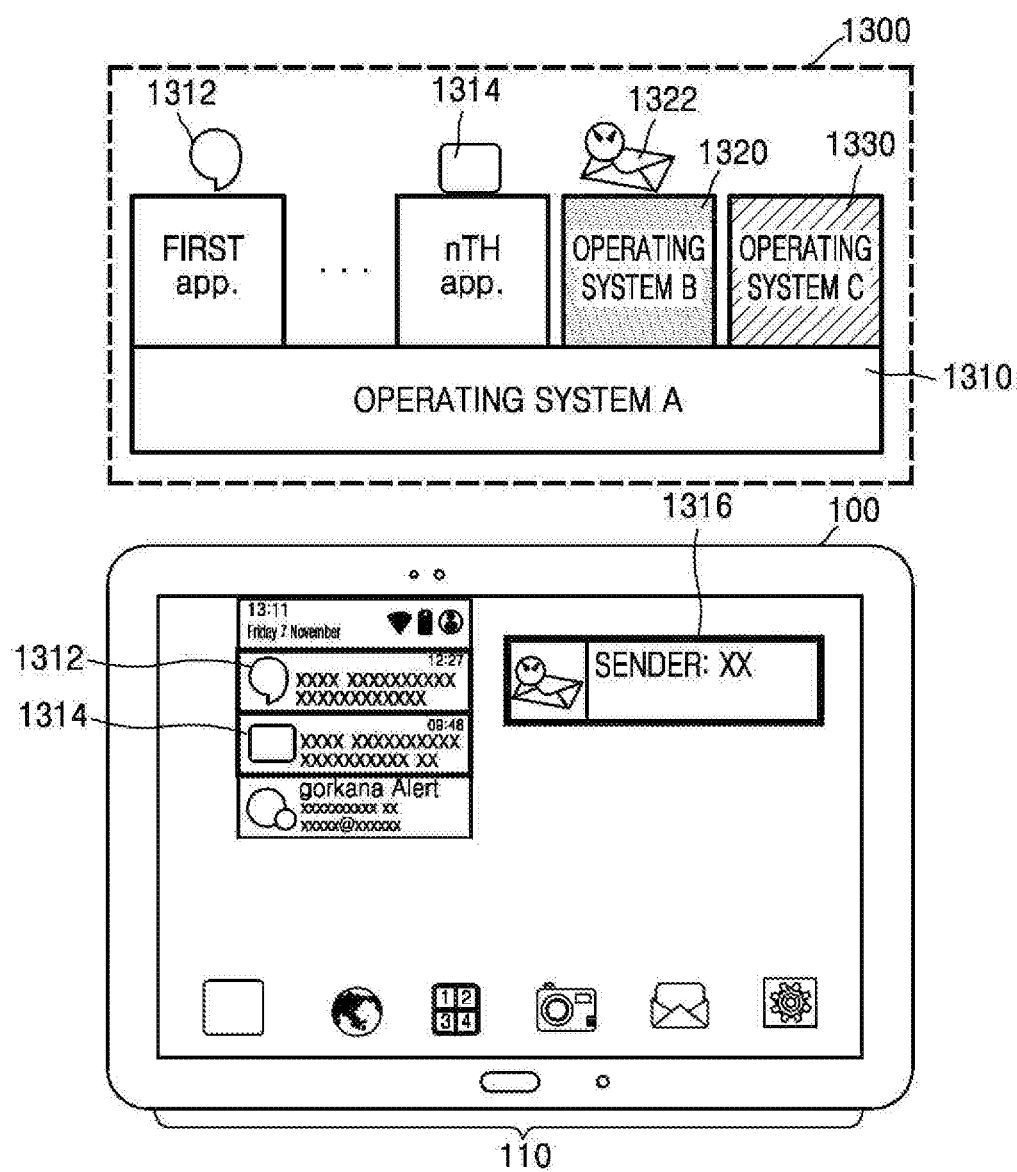
FIGS. 13A and 13B are diagrams for describing a method of displaying a notification generated in an OS running in the background of a device when a plurality of OSes are displayed by dividing a screen area of a first display of a device according to an embodiment.

Referring to FIG. 13A, when an event occurs in applications running on OS A 1310 of the device 100 according to an embodiment, notifications 1312 and 1314 may be generated. For example, when a message is received in a first messenger application running on OS A 1310, a first message notification 1312 may be generated. Also, when an email is received in a first email application running on OS A 1310, a first email notification 1314 may be generated. Also, when an email is received in a second email application running on OS B 1320, a second email notification 1322 may be generated.

The device 100 according to an embodiment may display the notifications 1312 and 1314 generated in OS A 1310 on the first display 110 on which OS A 1310 is displayed. Also, the device 100 may convert the notification 1322 generated in OS B 1320 running in the background according to a format preset for OS A 1310 and may display the converted notification on the first display 110.

Figure 13B:
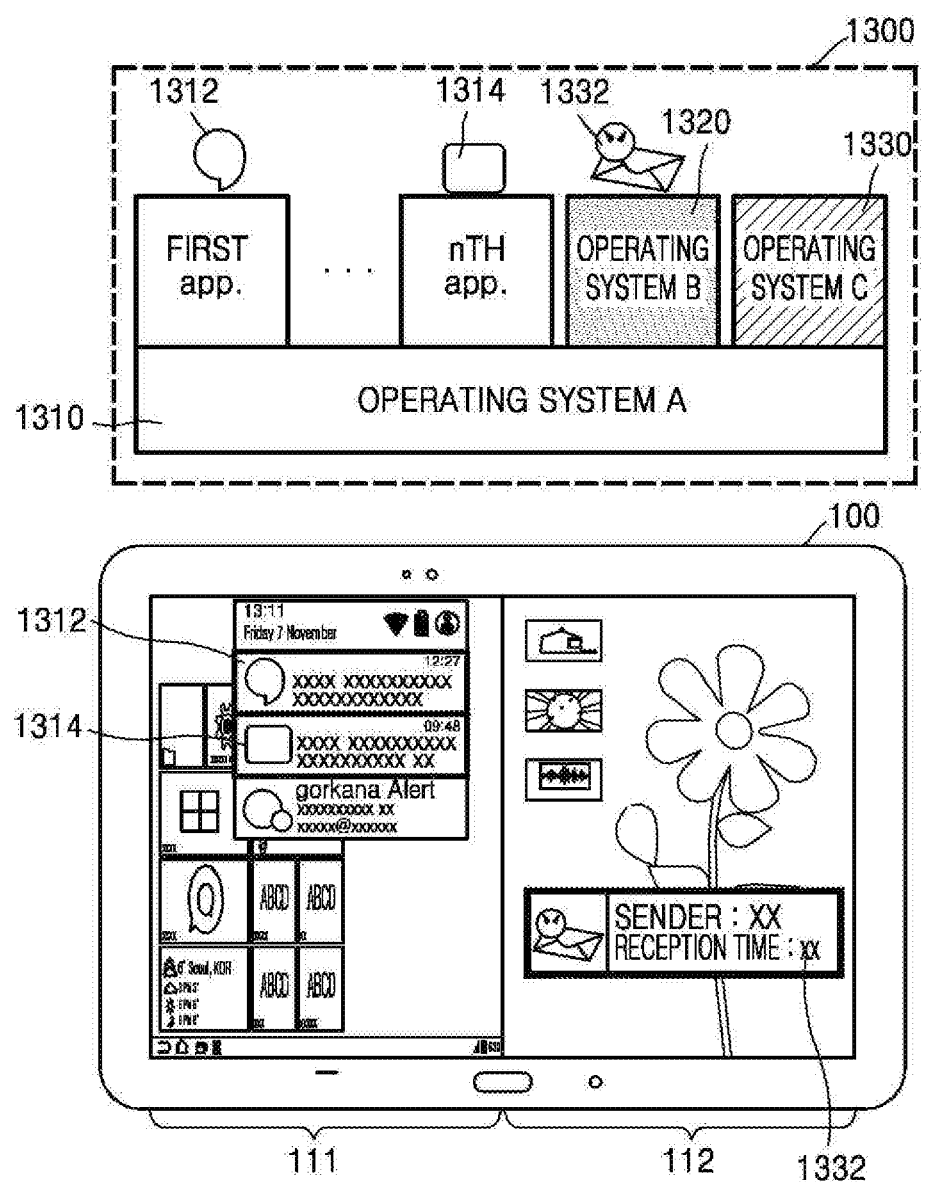

Referring to FIG. 13B, The device 100 according to an embodiment may divide a screen area of the first display 110 on the basis of an input received from a user to generate the first window 111 and the second window 112. The device 100 may display different OSes in the first window 111 and the second window 112. For example, OS A 1310 may be displayed in the first window 111, and OS C 1330 may be displayed in the second window 112.

In FIG. 13B, OS B 1320 may run in the background of the device 100.

The device 100 according to an embodiment may convert the second email notification 1322 generated in OS B 1320 running in the background on the basis of a preset format of an OS selected from between OS A 1310 and OS C 1330. For example, the device 100 may select OS C 1330 with low complexity on the basis of a complexity of each of the windows 111 and 112 in which OS A 1310 and OS C 1330 are respectively displayed. Here, the complexity may be determined depending on the number of execution windows that are displayed in a window when an application runs on the device 100. In FIG. 13B, two execution windows may be displayed in the first window 111 when two notifications 1312 and 1314 are generated in OS A 1310. On the other hand, since there is no execution window displayed in the second window 112, the device 100 may select OS C 1330 displayed in the second window 112 with low complexity.

The device 100 according to an embodiment may convert the notification 1322 generated in OS B 1320 on the basis of a preset format of the selected OS C 1330. For example, the second email notification 1322 of OS B 520 may include text indicating a sender of an email and an email icon image, and the preset format of OS C 1330 may include an email icon image and text indicating the sender and a reception time. By adding the text indicating the reception time to the notification 1322 generated in OS B 1320, the device 100 may convert the notification 1322.

The device 100 according to an embodiment may display a converted notification 1332 at a preset position in the second window 112 of the first display 110.

Figure 14:
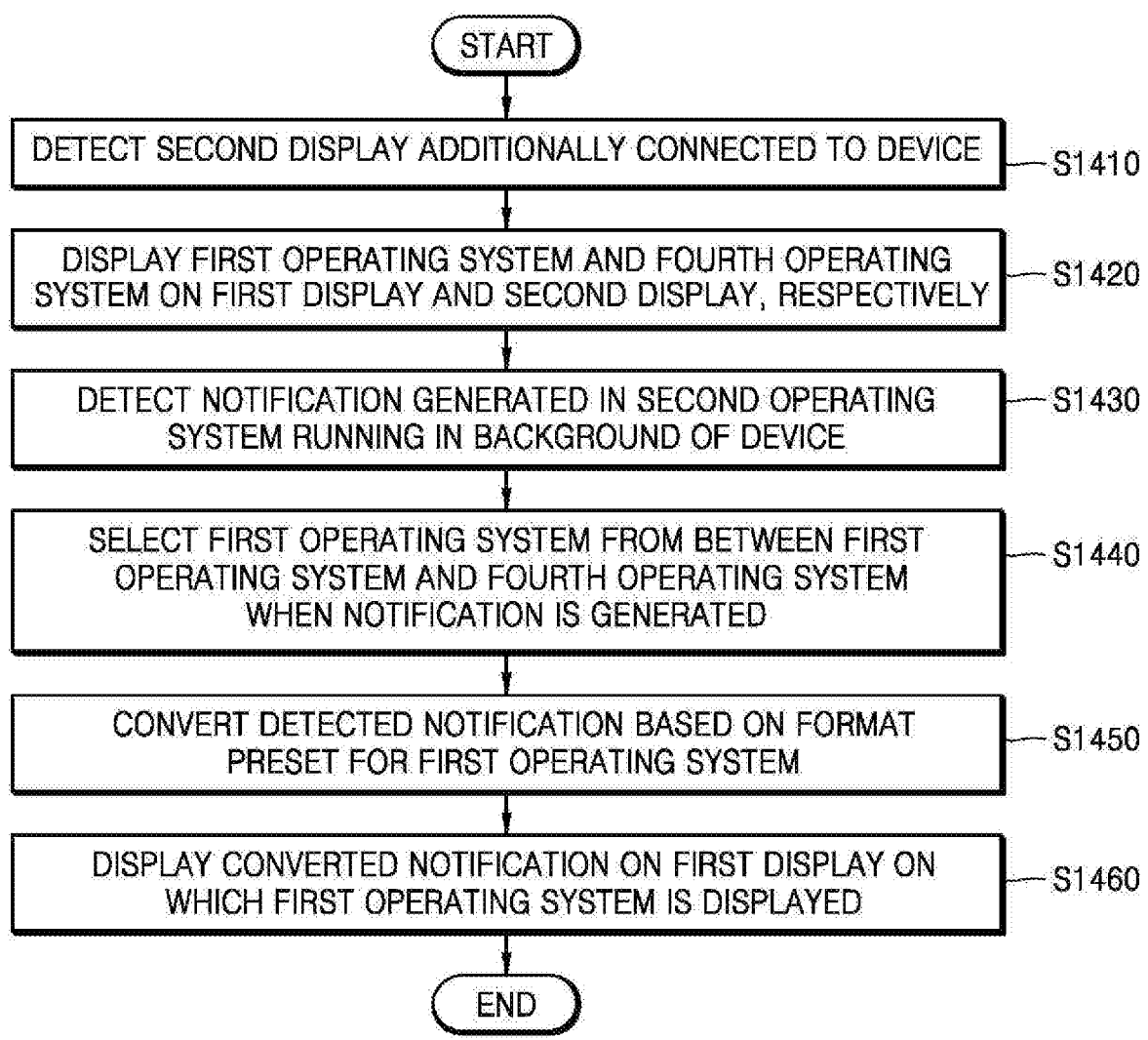
FIG. 14 is a flowchart for describing a method of displaying a notification generated in an OS running in the background of a device when a plurality of OSes are displayed by adding a second display to a device according to an embodiment.

FIG. 14 is a flowchart for describing a method of displaying a notification generated in an OS running in the background of the device 100 when a plurality of OSes are displayed by adding the second display 115 to the device 100 according to an embodiment.

In step S1410, the device 100 may detect the second display that is additionally connected to the device 100.

The second display may be connected by wire or wirelessly to the device 100 according to an embodiment. Thus, the device 100 may display different OSes on the first display and the second display.

In step S1420, the device 100 may display a first OS and a fourth OS on the first display and the second display, respectively.

The device 100 according to an embodiment may select a plurality of OSes to be displayed on the first display and the second display. As another example, the device 100 may receive a selection input from a user and display an OS corresponding to the received selection input on the first display and the second display.

Meanwhile, step S1420 may correspond to step S610, which has been described above with reference to FIG. 6.

In step S1430, the device 100 may detect a notification generated in a second OS running in the background of the device 100.

According to an embodiment, when an event occurs in a second application running on the second OS, a notification may be generated to provide information regarding the event to the user.

Meanwhile, step S1430 may correspond to step S220, which has been described above with reference to FIG. 2.

In step S1440, the device 100 may select the first OS from between the first OS and the fourth OS when the notification is generated.

The device 100 according to an embodiment may select an OS for displaying the generated notification from between the first OS and the fourth OS. As another example, the device 100 may select the first OS on the basis of a complexity of each of the first display and the second display in which the first OS and the fourth OS are respectively displayed. As still another example, an OS in which the generated notification is to be displayed may be preset in the device 100. As still another example, the device 100 may select the OS in which the generated notification is to be displayed on the basis of the type of application in which the notification is generated.

Meanwhile, step S1440 may correspond to step S630, which has been described above with reference to FIG. 6.

In step S1450, the device 100 may convert the generated notification on the basis of a format preset for the selected first OS.

Meanwhile, step S1450 may correspond to step S640, which has been described above with reference to FIG. 6.

In step S1460, the device 100 may display the converted notification on the first display 110 on which the first OS is displayed.

The device 100 according to an embodiment may display the converted notification at a preset position in a screen area of the first display 110. As another example, the device 100 may display the converted notification on the first display 110 on the basis of a complexity of the first display 110. As still another example, the device 100 may display the converted notification on the first display 110 on the basis of the type of converted notification.

Meanwhile, step S1460 may correspond to step S650, which has been described above with reference to FIG. 2.

FIG. 15 is a diagram for describing a method of displaying a notification generated in OSes 1520 and 1530 running in the background of the device 100 when a plurality of OSes 1510 to 1540 are displayed by adding the second display 115 to the device 100 according to an embodiment.

The device 100 according to an embodiment may run the plurality of OSes 1510, 1520, 1530, and 1540. Referring to an OS structure 1500 running on the device 100, among the plurality of OSes 1510, 1520, 1530, and 1540, OS A 1510 is a host OS, and OS B 1520, OS C 1530, and OS D 1540 are each a guest OS. Here, the method of operating the plurality of OSes 1510, 1520, 1530, and 1540 may be the same as described above with reference to FIG. 3.

Referring to FIG. 15A, when an event occurs in applications running on OS A 1510 of the device 100 according to an embodiment, a notification 1512 may be generated. For example, when a message is received in a first messenger application running on OS A 1510, a first message notification 1512 may be generated. Also, when an email is received in a first email application running on OS B 1520, a second email notification 1522 may be generated.

Also, when an email is received in a fourth email application running on OS D 1540, a fourth email notification 1542 may be generated. Also, when a message is received in a fourth messenger application running on OS D 1520, a fourth message notification 1544 may be generated.

The device 100 according to an embodiment may display the notification 1512 generated in OS A 1510 on the first display 110 on which OS A 1510 is displayed. Also, the device 100 may convert the notification 1522 generated in OS B 1520 running in the background according to a format preset for OS A 1510 and may display the converted notification 1516 on the first display 110. Also, the device 100 may convert the notification 1542 generated in OS D 1540 running in the background according to the format preset for OS A 1510 and may display the converted notification 1518 on the first display 110.

Referring to FIG. 15B, the second display 115 may be additionally connected to the device 100 according to an embodiment. The device 100 may display different OSes on the first display 110 and the second display 115 when the second display 115 is additionally connected to the device 100. For example, OS A 1510 may be displayed on the first display 110, and OS D 1540 may be displayed on the second display 115. Thus, the converted notifications 1516 and 1518 of a fourth OS may be displayed on the second display 115 as original notifications 1542 and 1544 before conversion.

In FIG. 15B, OS B 1520 and OS C 1530 may run in the background of the device 100. The device 100 according to an embodiment may convert the second email notification 1522 generated in OS B 1520 running in the background on the basis of a preset format of an OS selected from between OS A 1510 and OS D 1540. For example, the device 100 may select OS A 1510 on the basis of a complexity of each of the displays 110 and 115 in which OS A 1510 and OS D 1540 are respectively displayed.

In FIG. 15B, one execution window may be displayed on the first display 110 when one notification 1512 is generated in OS A 1510. Meanwhile, two execution windows may be displayed on the second display 115 when two notifications 1544 and 1546 are generated in OS D 1540. The device 100 may select OS A 1510 displayed on the first display 110 with low complexity.

The device 100 according to an embodiment may convert the notification 1522 generated in OS B 1520 on the basis of the preset format of the selected OS A 1510. The device 100 may display the converted notification 1516 at a preset position in the first display 110.

Figure 16:
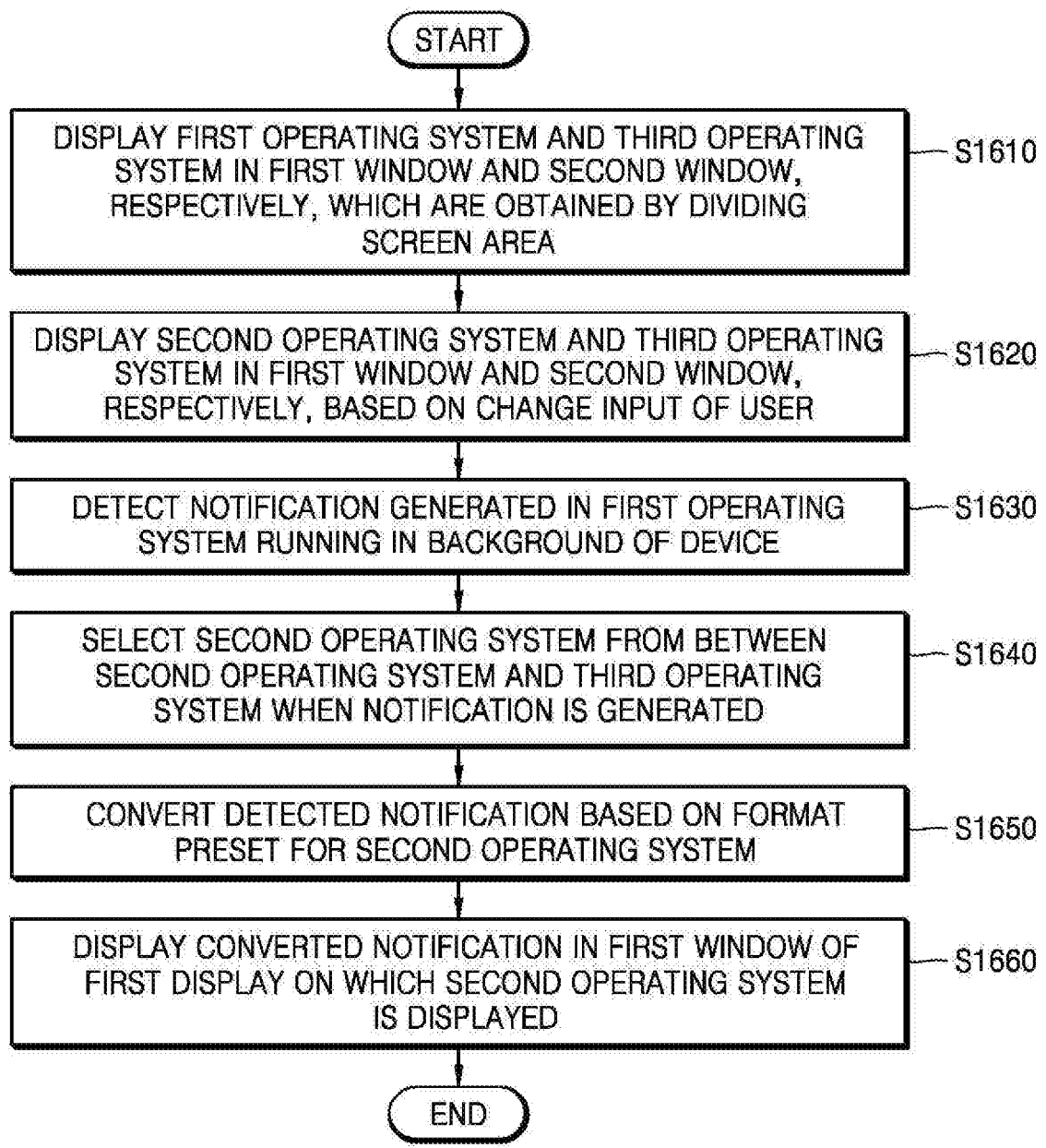
FIG. 16 is a flowchart for describing a method of displaying a notification generated in an OS running in the background when a plurality of OSes displayed on a first display of a device are changed according to an embodiment.

FIG. 16 is a flowchart for describing a method of displaying a notification generated in an OS running in the background of the device 100 when a plurality of OSes displayed on the first display 110 of the device 100 are changed according to an embodiment.

In step S1610, the device 100 may display a first OS and a third OS in the first window 111 and the second window 112 of the first display 110, respectively.

Meanwhile, step S1610 may correspond to step S410, which has been described above with reference to FIG. 4.

In step S1620, the device 100 may display a second OS and the third OS in the first window 111 and the second window 112 of the first display 110 on the basis of a change input of a user. Here, the change input of the user may include an identification value of an OS that is intended to be displayed in each window by the user. For example, the change input may include identification values of the second OS and the third OS.

When the change input of the user is received, the device 100 according to an embodiment may stop displaying the first OS. The device 100 may display the third OS in the first window 111 while stopping displaying the first OS. Thus, the first OS may run in the background of the device 100.

In step S1630, the device 100 may detect a notification generated in the first OS running in the background of the device 100.

According to an embodiment, when an event occurs in a first application running on the first OS, a notification may be generated to provide information regarding the event to the user.

Meanwhile, step S1630 may correspond to step S420, which has been described above with reference to FIG. 4.

In step S1640, the device 100 may select the second OS from between the second OS and the third OS when the notification is generated.

Meanwhile, step S1640 may correspond to step S430, which has been described above with reference to FIG. 4.

In step S1650, the device 100 may convert the generated notification on the basis of a format preset for the selected second OS.

According to an embodiment, the device 100 may convert the notification on the basis of the preset format of the second OS displayed in the first window to display the generated notification in the first window.

Meanwhile, step S1650 may correspond to step S440, which has been described above with reference to FIG. 4.

In step S1660, the device 100 may display the converted notification in the first window 111 of the first display 110 on which the second OS is displayed.

The device 100 according to an embodiment may display the converted notification at a preset position in the first window 111. As another example, the device 100 may display the converted notification at a determined position in the first window 111 on the basis of a complexity of the first window 111. As still another example, the device 100 may display the converted notification at the determined position in the first window 111 on the basis of the type of converted notification.

Meanwhile, step S1660 may correspond to step S450, which has been described above with reference to FIG. 4.

FIG. 17 is a diagram for describing a method of displaying a notification generated in an OS running in the background of the device 100 when a plurality of OSes displayed on the first display 110 of the device 100 are changed according to an embodiment.

The device 100 according to an embodiment may run a plurality of OSes 1710, 1720, and 1730. Referring to an OS structure 1700 running on the device 100, among the plurality of OSes 1710, 1720, and 1730, OS A 1710 is a host OS, and OS B 1720 and OS C 1730 are each a guest OS. Here, the method of operating the plurality of OSes 1710, 1720, and 1730 may be the same as described above with reference to FIG. 3.

Figure 17A:
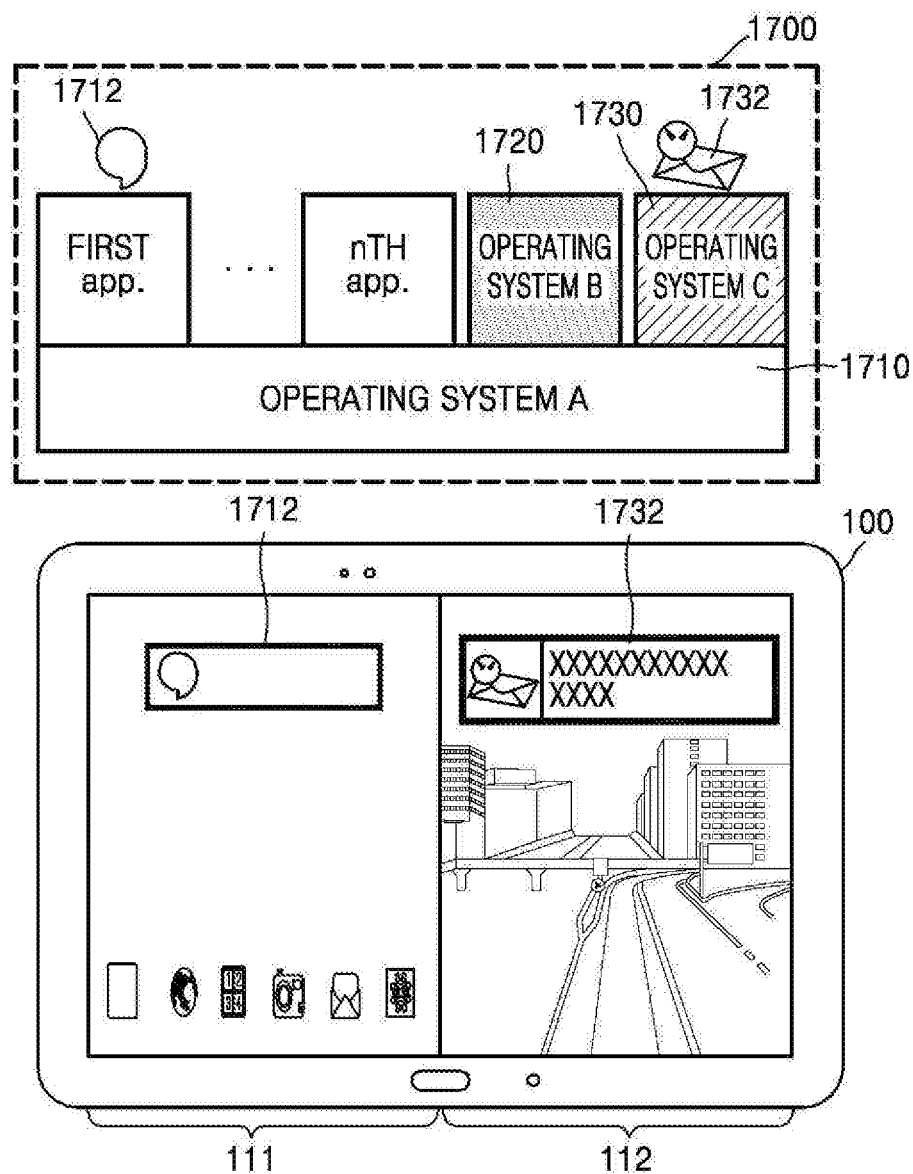
FIGS. 17A and 17B are diagrams for describing a method of displaying a notification generated in an OS running in the background when a plurality of OSes displayed on a first display of a device are changed according to an embodiment.

Referring to FIG. 17A, the device 100 according to an embodiment may divide a screen area of the first display 110 to generate the first window 111 and the second window 112. The device 100 may display different OSes in the first window 111 and the second window 112. For example, OS A 1710 may be displayed in the first window 111, and OS C 1730 may be displayed in the second window 112.

According to an embodiment, OS B 1720 may run in the background of the device 100. OS B 1720 which is running in the background may not be displayed on the first display 110 of the device 100.

Meanwhile, when an event occurs in applications of the plurality of OSes 1710, 1720, and 1730 installed in the device 100, notifications 1712, 1732, and 1734 may be generated.

For example, when a message is received in a first messenger application running on OS A 1710, a first message notification 1712 may be generated. Also, when an email is received in a third email application running on OS C 1730, a third email notification 1732 may be generated.

The device 100 according to an embodiment may display the notification 1712 generated in OS A 1710 in the first window 111 in which OS A 1710 is displayed. Also, the device 100 may display the notification 1732 generated in OS C 1730 in the second window 112 in which OS C 1730 is displayed.

Figure 17B:
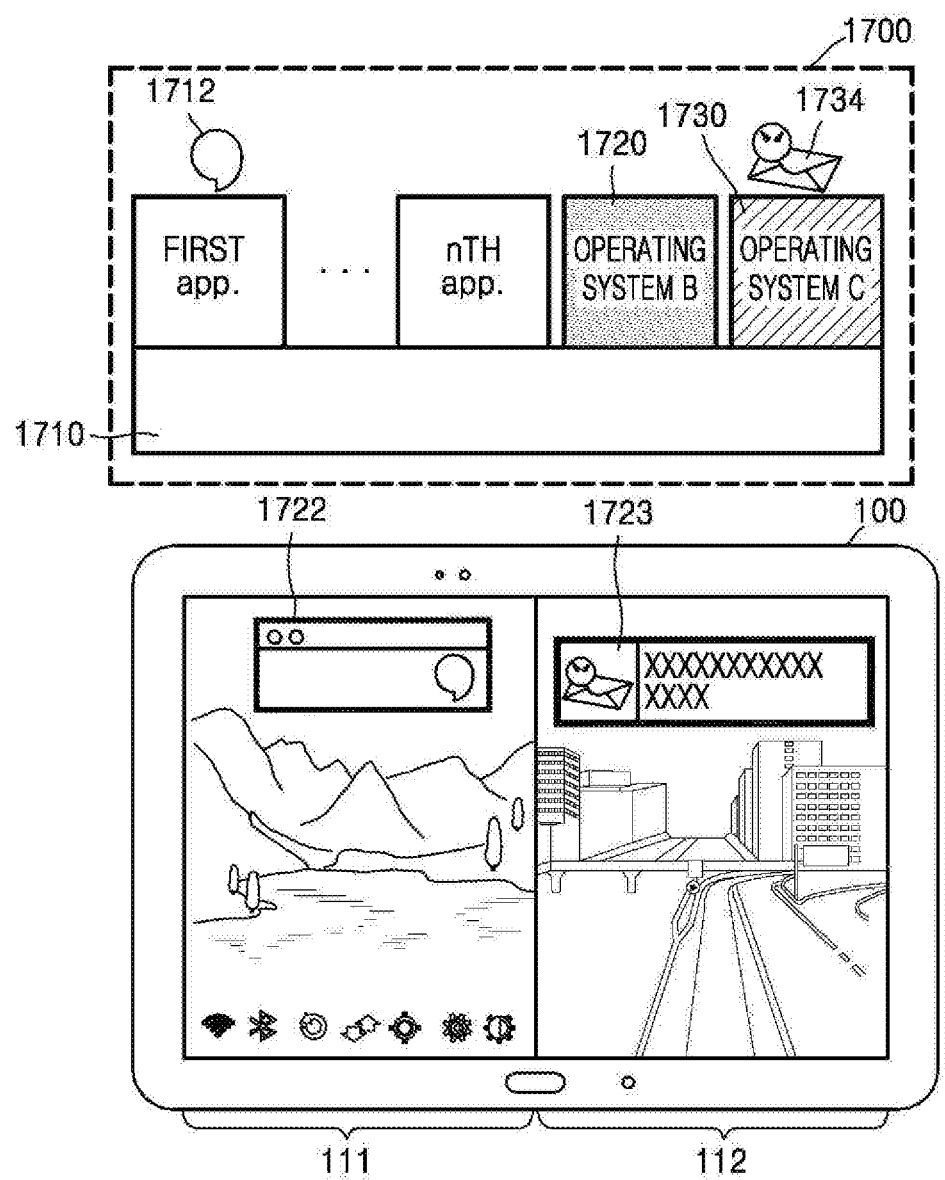

Referring to FIG. 17B, when a change input of a user is received, the device 100 may stop displaying OS A 1710. The device 100 according to an embodiment may display OS B 1720 selected according to the change input of the user in the first window 111 which stops displaying OS A 1710. Thus, OS A 1710 may run in the background of the device 100.

The device 100 according to an embodiment may detect the first message notification 1712 generated in OS A 1710 running in the background. The device 100 according to an embodiment may convert the generated first message notification 1712 on the basis of a preset format of an OS selected from between OS A 1710 and OS C 1730. For example, the device 100 may select OS B 1720 with low complexity on the basis of complexity of each of the windows 111 and 112 in which OS B 1720 and OS C 1730 are respectively displayed. Here, the complexity may be determined depending on the number of execution windows that are displayed in the windows when an application runs on the device 100.

The device 100 according to an embodiment may convert the notification 1712 generated in OS A 1710 on the basis of a preset format of the selected OS B 1730. For example, for the first message notification 1712 of OS A 1710, a message icon image may be arranged on the left side. For the preset format of OS B 1720, a message icon image may be arranged on the right side. By changing the position of the message icon image of the notification 1712 generated in OS A 1710 to the right side, the device may convert a notification 1712.

The device 100 according to an embodiment may display a converted notification 1722 at a preset position in the first window 112 in which OS B 1720 is displayed.

Figure 18:
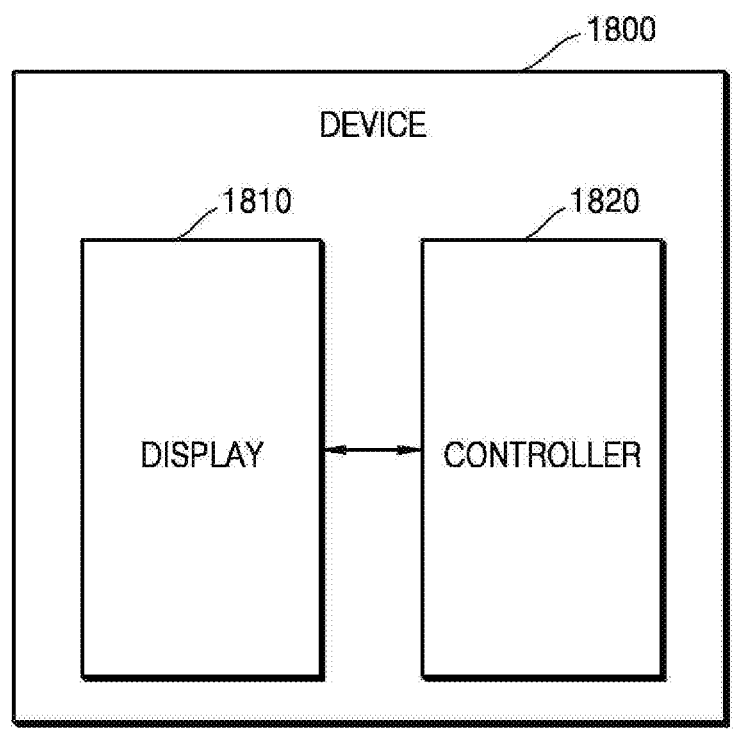
FIGS. 18 and 19 are block diagrams showing a device with a plurality of OSes installed therein according to an embodiment.
Figure 19:
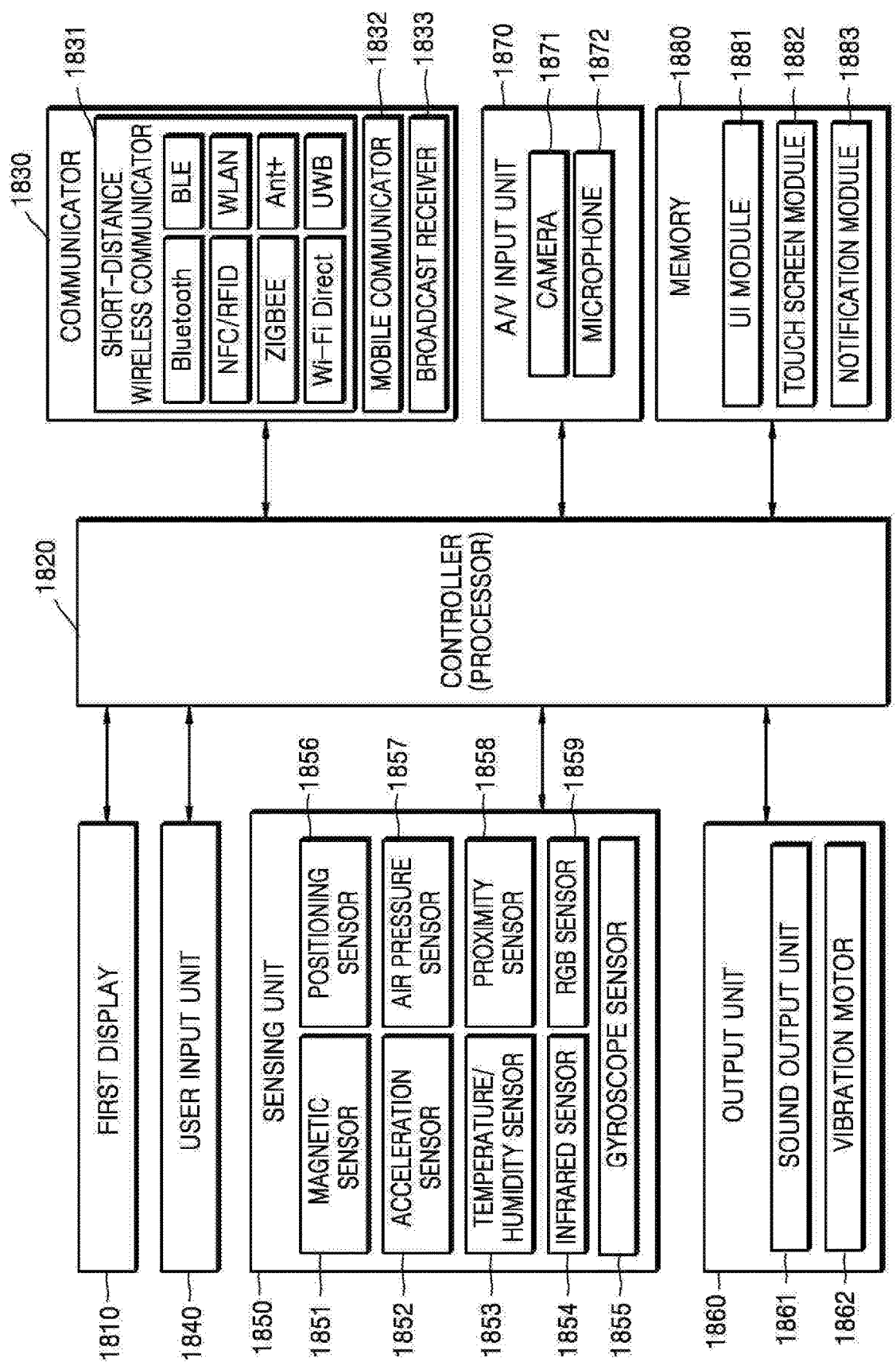

FIGS. 18 and 19 are block diagrams showing a device 1800 with a plurality of OSes installed therein according to an embodiment.

As shown in FIG. 18, a device 1800 according to an embodiment of the present invention may include a first display 1810 and a controller 1820. However, not all of the elements shown in this figure are essential. The device 1800 may be implemented by more or less elements than those shown in the figure.

For example, as shown in FIG. 19, the device 1800 according to an embodiment of the present invention may further include a communicator 1830, a user input unit 1840, a sensing unit 1850, an output unit 1860, an audio/video (A/V) input unit 1870, and a memory 1880 in addition to the first display 1810 and the controller 1820.

Meanwhile, the device 1800 of FIGS. 18 and 19 may correspond to the device 100 that has been described above with reference to FIGS. 1 to 17.

The above elements will be described below in sequence.

The first display 1810 according to an embodiment displays at least one of a plurality of OSes. For example, the first display 1810 may display a first OS among the plurality of OSes. Also, the first display 1810 may display an OS in each window which is obtained by dividing a screen area of the first display 1810. For example, the first OS may be displayed in a first window (not shown) of the first display 1810, and a third OS may be displayed in a second window (not shown).

However, the first OS, a second OS, and the third OS are merely examples for describing the plurality of OSes displayed on the first display 1810. Accordingly, the present invention is not limited thereto.

A notification generated in the first OS may be displayed on the first display 1810 according to an embodiment. Also, when a notification of the second OS running in the background of the device is converted by the controller 1820, the first display 1810 may display the converted notification.

The first display 1810 according to an embodiment outputs information that has been processed by the device 1800. For example, the first display 1810 may receive at least some of received images. The first display 1810 may display an image of a received screen at one side thereof.

When the first display 1810 and a touchpad form a layered structure to configure a touch screen, the first display 1810 may also be used as an input device as well as an output unit. The first display 1810 may include at least one of a liquid crystal display (LCD), a thin film transistor-LCD (TFT-LCD), an organic light-emitting diode (OLED), a flexible display, a three-dimensional (3D) display, and an electrophoretic display. The device 1800 may further include one or more displays in addition to the first display 1810 according to an implementation of the device 1800.

Typically, the controller 1820 controls an overall operation of the device 1800. For example, the controller 1820 may generally control the first display 1810, the communicator 1830, the user input unit 1840, the sensing unit 1850, the output unit 1860, the A/V input unit 1870, and the memory 1880 by executing programs stored in the memory 1880.

The controller 1820 according to an embodiment identifies the first OS that is displayed on the first display 1810. Also, the controller 1820 detects a notification that is generated in the second OS running in the background of a device among a plurality of OSes. The controller 1820 according to an embodiment may convert the detected notification on the basis of a preset format of the first OS that is displayed on the first display 1810. The controller 1820 may control the first display 1810 such that the converted notification is displayed on the first display 1810.

The controller 1820 according to an embodiment may control communication between the plurality of OSes stored in the memory 1880. Here, it is assumed that, among the plurality of OSes, the first OS is a host OS, and the other OSes are each a guest OS.

For example, when a notification is generated in the second OS running in the background of the device 1800, the controller 1820 may deliver information regarding the notification to the first OS. The controller 1820 may control the first OS to convert the notification generated in the second OS on the basis of the preset format of the first OS. According to this embodiment, the notification generated in the second OS may be converted in the first OS.

As another example, when a notification is generated in the second OS running in the background of the device 1800, the controller 1820 may control the second OS to convert the generated notification on the basis of the format of the first OS that is being displayed on the display 1810. According to this embodiment, the notification generated in the second OS may be converted in the second OS and then delivered to the first OS.

As still another example, when a notification is generated in the second OS running in the background of the device 1800, the controller 1820 may control the first OS, which is the host OS, to convert the generated notification on the basis of a format of the third OS that is being displayed on the display 1810. According to this embodiment, the notification generated in the second OS may be converted in the first OS, which serves as an intermediary, and then delivered to the third OS.

When a plurality of OSes, that is, the first OS and the third OS, are displayed on the first display 1810, the controller 1820 according to an embodiment may select an OS that is a criterion for converting the notification of the second OS running in the background of the device 1800. For example, the controller 1820 may select one of the first OS and the third OS on the basis of priority information preset for the plurality of OSes. As another example, the controller 1820 may select one OS on the basis of a complexity of windows in which the first OS and the third OS are respectively displayed. As still another example, the controller 1820 may select one of the first OS and the third OS on the basis of OS information preset for the second OS in which the notification is generated.

The controller 1820 according to an embodiment may detect a second display of an external device connected to the device 1800. The controller 1820 may select a fourth OS from among the plurality of OSes and display the selected fourth OS on the second display.

When a plurality of OSes, that is, the first OS and the fourth OS, are displayed on the first display 1810 and the second display, respectively, the controller 1820 may select an OS that is a criterion for converting the notification of the second OS running in the background of the device 1800. For example, the controller 1820 may select one of the first OS and the fourth OS on the basis of priority information preset for the plurality of OSes.

As another example, the controller 1820 may select one OS on the basis of a complexity of each of displays on which the first OS and the fourth OS are respectively displayed. As still another example, the controller 1820 may select one OS on the basis of the type of each of the displays on which the first OS and the fourth OS are displayed. As still another example, the controller 1820 may select one of the first OS and the third OS on the basis of OS information preset for the second OS in which the notification is generated.

The controller 1820 according to an embodiment may determine an OS to be displayed, on the basis of a selection input received from a user. Also, the controller 1820 according to an embodiment may change an OS to be displayed, on the basis of a change input received from a user.

The communicator 1830 may include one or more elements for communicating between the device 1800 and the second display of the external device. For example, the communicator 1830 may include a short-range wireless communicator 1831, a mobile communicator 1832, and a broadcast receiver 1833.

The short-range wireless communicator 1831 may include, but is not limited to, a Bluetooth communicator, a Bluetooth Low Energy (BLE) communicator, a near field communication (NFC) unit, a wireless local area network (WLAN) communicator, a Zigbee communicator, an Infrared Data Association (IrDA) communicator, a Wi-Fi Direct (WFD) communicator, an ultra wideband (UWB) communicator, an Ant+ communicator, etc.

The mobile communicator 1832 transmits and receives a radio signal to and from at least one of a base station, an external terminal, and a server over a mobile communication network. Here, the radio signal may include a voice call signal, a video call signal, or various types of data according to a transmission and/or reception of text and/or multimedia messages.

The broadcast receiver 1833 receives a broadcast signal and/or broadcast-related information from the outside over a broadcast channel. The broadcast channel may include a satellite channel and a terrestrial channel. Depending on implementation, the device 1800 may not include the broadcast receiver 1833.

The user input unit 1840 refers to a means used by the user to enter data for controlling the device 1800. For example, the user input unit 1840 may include, but is not limited to, a key pad, a dome switch, a touchpad (a contact capacitance type, a pressure resistance type, an infrared sensing type, a surface ultrasonic wave conduction type, an integral tension measurement type, a piezoelectric effect type, etc.), a jog wheel, a jog switch, etc.

The user input unit 1840 according to an embodiment may receive a selection input for selecting an OS to be displayed on at least one of the first display and the second display, among the plurality of OSes installed in the device 1800. Also, the user input unit 1840 may receive a change input for changing an OS to be displayed on at least one of the first display and the second display. Meanwhile, this is merely an embodiment of the present invention. The user input unit 1840 may receive a user input needed to perform an operation of the device 1800, which has been described above with reference to FIGS. 1 to 17.

The sensing unit 1850 may include, but is not limited to, at least one of a magnetic sensor 1851, an acceleration sensor 1852, a temperature/humidity sensor 1853, an infrared sensor 1854, a gyroscope sensor 1855, a positioning sensor (e.g., a Global Positioning System (GPS) sensor) 1856, an air pressure sensor 1857, a proximity sensor 1858, and an RGB sensor (that is, an illumination sensor) 1859. A function of each of the sensors may be directly inferred from its name by those skilled in the art, and thus a detailed description thereof will be omitted.

The output unit 1860 is used to perform an operation determined by the controller 1820 and may include a sound output unit 1861, a vibration motor 1862, etc. However, this is merely one embodiment. As another example, the output unit 1860 may include the display 1810.

The sound output unit 1861 outputs audio data that is received from the communicator 1830 or stored in the memory 1880. Also, the sound output unit 1861 outputs a sound signal associated with a function (e.g., a call signal received sound, a message received sound, or a notification sound) performed by the device 1800. The sound output unit 1861 may include a speaker, a buzzer, etc.

The vibration motor 1862 may output a vibration signal. For example, the vibration motor 753 may output a vibration signal corresponding to an output of audio data or video data (e.g., the call signal received sound, the message received sound, etc.). Also, the vibration motor 753 may output the vibration signal when a touch is input to the touch screen.

The A/V input unit 1870 is used to enter an audio signal or video signal and may include a camera 1871, a microphone 1872, etc. The camera 1871 may obtain an image frame of a still image or a moving image through an image sensor in a video call mode or in a photographing mode. The image captured through the image sensor may be processed through the controller 1820 or a separate image processing unit (not shown).

The image frame processed by the camera 1871 may be stored in the memory 1880 or transmitted to the outside through the communicator 1830. The camera 1871 may be provided as two or more cameras according to an aspect of the configuration of the device.

The microphone 1872 receives an external sound signal and processes the received external sound signal into electrical voice data. For example, the microphone 1872 may receive a sound signal from an external device or a talker. The microphone 1872 may use various noise removal algorithms for removing noise generated while receiving the external sound signal.

The memory 1880 may store processing and controlling programs of the controller 1820 or may store input/output data.

The memory 1880 according to an embodiment may store a plurality of OSes. Also, the memory 1880 may store applications running on each of the plurality of OSes. Also, the memory 1880 may store a virtual machine for running each of the plurality of OSes.

The memory 1880 according to an embodiment may store priority information preset for the plurality of OSes.

The memory 1880 may include at least one storage medium among a flash memory type memory, a hard disk type memory, a multimedia card micro type memory, a card type memory (e.g., a secure digital (SD) or extreme digital (XD) memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disc. Also, the device 1800 may operate a web storage device or a cloud server that performs a storage function of the memory 1880 over the Internet.

Programs stored in the memory 1880 may be classified into a plurality of modules according to their functions and, for example, may be classified into a user interface (UI) module 1881, a touch screen module 1882, a notification module 1883, etc.

The UI module 1881 may provide an application-specific UI, graphic user interface (GUI), or the like that is linked with the device 1800. The touch screen module 1882 may detect a touch gesture of a user on the touch screen and deliver information regarding the touch gesture to the controller 1820. The touch screen module 1882 according to an embodiment of the present invention may recognize and analyze a touch code. The touch screen module 1882 may also be configured as separate hardware including a controller.

Various sensors may be provided inside or near the touch screen to detect a touch or a proximity touch on the touch screen. An example of a sensor for detecting a touch on the touch screen is a tactile sensor. The tactile sensor refers to a sensor for detecting a contact of a specific object to such a degree that a human may feel the contact with the specific object or to a higher degree. The tactile sensor may detect various types of information such as a roughness of a contact surface, a hardness of a contact object, a temperature at a contact point, etc.

Also, an example of a sensor for detecting a touch on the touch screen is a proximity sensor.

The proximity sensor refers to a sensor for detecting an object that is approaching a predetermined detection surface or a neighboring object without mechanical contact by using electromagnetic force or infrared light. Examples of the proximity sensor include a transmissive photoelectric sensor, a direct reflective photoelectric sensor, a mirror reflective photoelectric sensor, a high-frequency oscillation proximity sensor, a capacitive proximity sensor, a magnetic proximity sensor, and an infrared proximity sensor. Examples of the touch gesture of the user may include a tap, a touch and hold, a double tap, a drag, a pan, a flick, a drag and drop, a swipe, etc.

The notification module 1883 may generate a signal which notifies of an occurrence of an event in the device 1800. Examples of the event occurring in the device 1800 may include an acquisition or reception of new information by an application, a reception of a call signal, a reception of a message, an input of a key signal, a notification of a schedule, an acquisition of a user input, etc. The notification module 1883 may also output a notification signal in the form of a video signal through the first display 1810, output a notification signal in the form of an audio signal through the sound output unit 1861, and output a notification signal in the form of a vibration signal through the vibration motor 1863.

The device according to the disclosed embodiment may include a processor, a memory for storing and executing program data, a permanent storage such as a disk drive, a communication port for communicating with external devices, UI devices such as a touch panel, keys, and buttons, etc. When software modules or algorithms are involved, these software modules or algorithms may be stored as program instructions or computer-readable codes executable in the processor in a computer-readable recording medium. Examples of the computer-readable recording medium include magnetic storage media (e.g., a ROM, a RAM, a floppy disk, a hard disk, etc.), optical recording media (e.g., a compact disc read-only memory (CD-ROM), a digital versatile disc (DVD), etc.), and so on. The computer-readable recording medium may be distributed over network-coupled computer systems so that the computer-readable code is stored and executed in a distributed fashion. The media can be read by the computer, stored in the memory, and executed by the processor.

In the disclosed embodiment, all references, including publications, patent applications, and patents cited herein are hereby incorporated by reference to an extent as if each reference were individually and specifically indicated to be incorporated by reference and were set forth in its entirety herein.

For the purposes of promoting an understanding of the embodiments, reference has been made to embodiments illustrated in the drawings, and specific language has been used to describe the embodiments. However, no limitation of the scope of the embodiments is intended by this specific language, and the embodiments should be construed as encompassing all embodiments that would normally occur to one of ordinary skill in the art.

The embodiments may be described in terms of functional block components and various processing steps. Such functional blocks may be realized by any number of hardware and/or software components configured to perform the specified functions. For example, the embodiments may employ various integrated circuit (IC) components, e.g., memory elements, processing elements, logic elements, look-up tables, and the like, which may carry out a variety of functions under the control of one or more microprocessors or other control devices. Similarly, where the elements of the embodiments are implemented using software programming or software elements, the embodiments may be implemented with any programming or scripting language such as C, C++, Java, assembler, or the like with the various algorithms being implemented with any combination of data structures, objects, processes, routines or other programming elements. Functional aspects may be implemented in algorithms that execute on one or more processors. Also, embodiments may employ any number of conventional techniques for electronic configuration, signal processing and/or control, data processing and the like. The terms "mechanism," "element," "means," and "configuration" are used broadly and are not limited to mechanical or physical components, but may include software routines in conjunction with processors or the like.

The particular implementations shown and described herein are illustrative examples and are not intended to otherwise limit the scope of the embodiments in any way. Indeed, for the sake of brevity, conventional electronic components, control systems, software, and other functional aspects of the systems may not be described in detail. Furthermore, the connecting lines or connectors shown in the various presented figures are intended to represent exemplary functional relationships, physical connections, or logical couplings between the various elements. It should be noted that many alternative or additional functional relationships, physical connections or logical connections may be present in a practical apparatus. Moreover, no item or component is essential to the practice of the embodiments unless the element is specifically described as "essential" or "critical."

The invention claimed is:

1. A method of displaying a notification on a device, the method comprising:
displaying a first OS on a display of the device;
identifying a second OS running in an external device connected with the device;
detecting an event notification generated in the second OS in response to an event occurring in the second OS, wherein data of the detected event notification has a second format of the second OS;
converting the second format of data of the detected event notification based on a first format of data of the first OS, in response to the event notification being detected; and
displaying the converted event notification on the display on which the first OS is displayed to provide information regarding the event.

2. The method of claim 1, further comprising:
displaying the first OS and a third OS on the display, wherein data of the third OS has a third format; and
selecting an OS from between the first OS and the third OS when the event notification is generated, wherein
the converting of the generated event notification comprises converting the generated event notification based on the format of data of the selected OS.

3. The method of claim 2, further comprising dividing a screen area of the display into a first window for displaying the first OS and a second window for displaying the third OS.

4. The method of claim 3, wherein the selecting of the OS comprises selecting the OS based on a complexity of each of the first window and the second window.

5. The method of claim 3, further comprising:
stopping displaying the third OS in the second window;
running the third OS in a background of the device; and
converting another detected event notification based on the first format of the first OS when the other detected event notification is generated in at least one of the second OS and the third OS.

6. The method of claim 3, further comprising:
stopping displaying the third OS in the second window;
displaying the third OS on a display of the external device.

7. The method of claim 6, wherein the selecting of the OS comprises:
identifying types of the display and the display of the external device; and
selecting the OS based on the identified types of the displays.

8. The method of claim 6, wherein the selecting of the OS comprises selecting the OS based on a complexity of each of the display and the display of the external device.

9. The method of claim 6, further comprising:
stopping displaying the third OS on the display of the external device;
running the third OS in a background of the device; and
converting another detected event notification based on the first format of the first OS when the other detected event notification is generated in the second OS or the third OS.

10. The method of claim 2, further comprising:
stopping displaying the first OS on the display;
displaying the second OS on the display;
detecting an event notification generated in the first OS; and
displaying the detected event notification generated in the first OS.

11. A device comprising:
a display; and
at least one processor configured to:
control the display to display a first OS,
identify a second OS running in an external device connected with the device,
detect an event notification generated in the second OS in response to an event occurring in the second OS, wherein data of the detected event notification has a second format of the second OS,
convert the second format of data of the detected event notification based on a first format of data the first OS, in response to the event notification being detected, and
control the display to display the converted event notification on the display on which the first OS is displayed to provide information regarding the event.

12. The device of claim 11, wherein the at least one processor is configured to:
control the display to display the first OS and a third OS, wherein data to the third OS has a third format
select an OS from between the first OS and the third OS when the notification is generated, and
convert the generated event notification based on the format of data of the selected OS.

13. The device of claim 12, wherein the at least one processor is configured to:
divide a screen area of the display into a first window and a second window, and
control the display to display the first OS in the first window and a third OS in the second window.

14. The device of claim 13, wherein the at least one processor is configured to select the OS based on a complexity of each of the first window and the second window.

15. The device of claim 13, wherein the at least one processor is configured to:
stop displaying the third OS in the second window,
run the third OS in a background of the device, and
convert another detected event notification based on the first format of the first OS when the other detected event notification is generated in at least one of the second OS and the third OS.

16. The device of claim 13, wherein the at least one processor is configured to:
control the display to stop display of the third OS in the second window, and
control the display to display the third OS on a display of the external device.

17. The device claim 16, wherein the at least one processor is configured to:
identify types of the display and the display of the external device, and
select the OS based on the identified types of the displays.

18. The device of claim 16, wherein the at least one processor is configured to select the OS based on a complexity of each of the display and the display of the external device.

19. The device of claim 16, wherein the at least one processor is configured to:
control the display to stop displaying the third OS on the display of the external device,
run the third OS in a background of the device, and
convert another detected event notification based on the first format of the first OS when the other detected event notification is generated in the second OS or the third OS.

20. The device of claim 12, wherein the at least one processor is configured to:
- control the display to stop displaying the first OS,
- control the display to display the second OS,
- detect an event notification generated in the first OS, and
- control the display to display the detected event notification generated in the first OS.

* * * * *